(12) United States Patent
Folkins

(10) Patent No.: US 7,021,732 B2
(45) Date of Patent: Apr. 4, 2006

(54) PRINTER JET DETECTION METHOD AND APPARATUS

(75) Inventor: Jeffrey J. Folkins, Rochester, NY (US)

(73) Assignee: Xerox Corporation, Stamford, CT (US)

(*) Notice: Subject to any disclaimer, the term of this patent is extended or adjusted under 35 U.S.C. 154(b) by 254 days.

(21) Appl. No.: 10/704,790

(22) Filed: Nov. 12, 2003

(65) Prior Publication Data
US 2005/0099439 A1 May 12, 2005

(51) Int. Cl.
B41J 25/308 (2006.01)

(52) U.S. Cl. .................... 347/8; 347/9; 347/19; 347/38

(58) Field of Classification Search ..................... 347/9
See application file for complete search history.

(56) References Cited

U.S. PATENT DOCUMENTS

| 5,389,958 A | 2/1995 | Bui et al. | |
| 5,949,452 A | 9/1999 | Jones | |
| 6,000,776 A * | 12/1999 | Suzuki et al. | 314/19 |
| 6,113,231 A | 9/2000 | Burr et al. | |
| 6,623,095 B1 * | 9/2003 | Ward et al. | 347/19 |
| 2003/0058295 A1 * | 3/2003 | Heiles et al. | 347/19 |

* cited by examiner

Primary Examiner—Thinh Nguyen
Assistant Examiner—Brian J. Goldberg
(74) Attorney, Agent, or Firm—Maginot Moore Beck

(57) ABSTRACT

A method includes ejecting ink from a first set of one or more nozzles to form a first image pattern at least partially within an image field. The method likewise includes ejecting ink from a second set of one or more nozzles to form a second image pattern at least partially within the image field. The first image pattern and second image pattern form a composite pattern within the image field. Then, an optical detector obtains a measurement of an optical characteristic of the image field. The measurement may be compared with a reference optical characteristic for the composite pattern within the image field.

20 Claims, 13 Drawing Sheets

PRINTER JET DETECTION METHOD AND APPARATUS

BACKGROUND AND SUMMARY

The present disclosure relates generally to ink jet printers, and more particularly, to detection of ink jet operation within ink jet printers.

Ink-jet printing systems commonly utilize either direct printing or offset printing architectures. In a typical direct printing system, ink is ejected from jets in the print head directly onto the final receiving medium. In an offset printing system, the print head jets the ink onto an intermediate transfer surface, such as a liquid layer on a drum. The final receiving medium is then brought into contact with the intermediate transfer surface and the ink image is transferred and fused or fixed to the medium.

In some direct and offset printing systems, the print head moves relative to the final receiving medium or the intermediate transfer surface in two directions as the print head jets are fired. Typically, the print head is translated at least somewhat along the X-axis, or cross-process direction, while the final receiving medium or intermediate transfer surface is moved along the Y-axis or process direction. In this manner, the print head effectively "scans" over the print medium and forms a dot-matrix image by selectively depositing ink drops at specific locations on the medium.

In the offset printing architecture, the print head typically moves in the X-axis direction that is parallel to the axis of the rotating drum on which the intermediate transfer surface is supported. Typically, the print head includes multiple jets configured in one or more linear arrays that print a set of scan lines on the intermediate transfer surface with each drum rotation. Precise placement of the scan lines is necessary to meet image resolution requirements and to avoid producing undesired printing artifacts, such as banding or streaking. Accordingly, the X-axis (head translation) and the Y-axis (drum rotation) motions must be carefully coordinated with the firing of the jets to insure proper scan line placement.

Offset printers often employ print heads that have jets extending over a significant width (X-axis displacement) in order to increase printing speed. In general, a wider print head requires less X-axis movement and can reduce the number of revolutions required to print an image. For example, if a print head extends the entire axial length of the drum and contains as many ink jets as are necessary to print the required resolution, then printing may be achieved by simply rotating the drum a single time and no head translation would be required. Alternatively, multiple print heads that are arranged in such manner as to combine to extend over the entire X-axis direction may also achieve single revolution or "single pass" printing. Such printers are known.

Still other designs employ at least some X-axis displacement in order to reduce the number of ink jets required to achieve a particular resolution. For example, if an x-axis resolution of 600 dots per inch (DPI) is desired in a printer having a usable printing width of 12 inches, then a single pass printer (with no X-axis displacement) would require 7200 ink jets per ink color. However, a multipass printer having twenty-four passes using some degree of X-axis displacement would only require 300 ink jets per ink color to achieve the same resolution image. Specifically, the three hundred ink jets would move to discrete, unique X-axis positions on each of the twenty-four printing passes, so that all 7200 pixels are ultimately covered.

Multipass printers typically employ interleaving or interlacing to achieve the desired resolution. In interleaved or interlaced printing, the print head includes jets that are spaced apart by a distance greater than the final DPI resolution. During each pass of the intermediate transfer surface, the jets are aligned to print at select, spaced-apart X-axis positions. Accordingly, each pass only prints a fraction of the total X-axis position within the overall width of the print head. After each pass, the print head translates in the X-axis direction by a distance that aligns the jets to print along previously unprinted X-axis positions. Eventually, after a certain number of passes, all of the pixel columns that fall within the width of the printable space have been exposed to a jet.

Similar to single pass printers, multi-pass printers may employ multiple staggered print heads to further improve the printing speed. Staggered print heads may effectively extend over large portions of the X-axis dimension to reduce the amount of X-axis scanning displacement while employing smaller and less expensive print head hardware.

In all of the above designs, as well as others, it is important to ensure the accuracy of X-axis and Y-axis alignment of the jets during the printing process.

A method disclosed herein includes ejecting ink from a first set of one or more nozzles to form a first image pattern at least partially within an image field. The method likewise includes ejecting ink from a second set of one or more nozzles to form a second image pattern at least partially within the image field. The first image pattern and second image pattern form a composite pattern within the image field. Then, an optical detector obtains a measurement of an optical characteristic of the image field. The measurement may be compared with a reference optical characteristic for the composite pattern within the image field.

The above described features and advantages, as well as others, will become more readily apparent to those of ordinary skill in the art by reference to the following detailed description and accompanying drawings.

DETAILED DESCRIPTION

Figure 1:
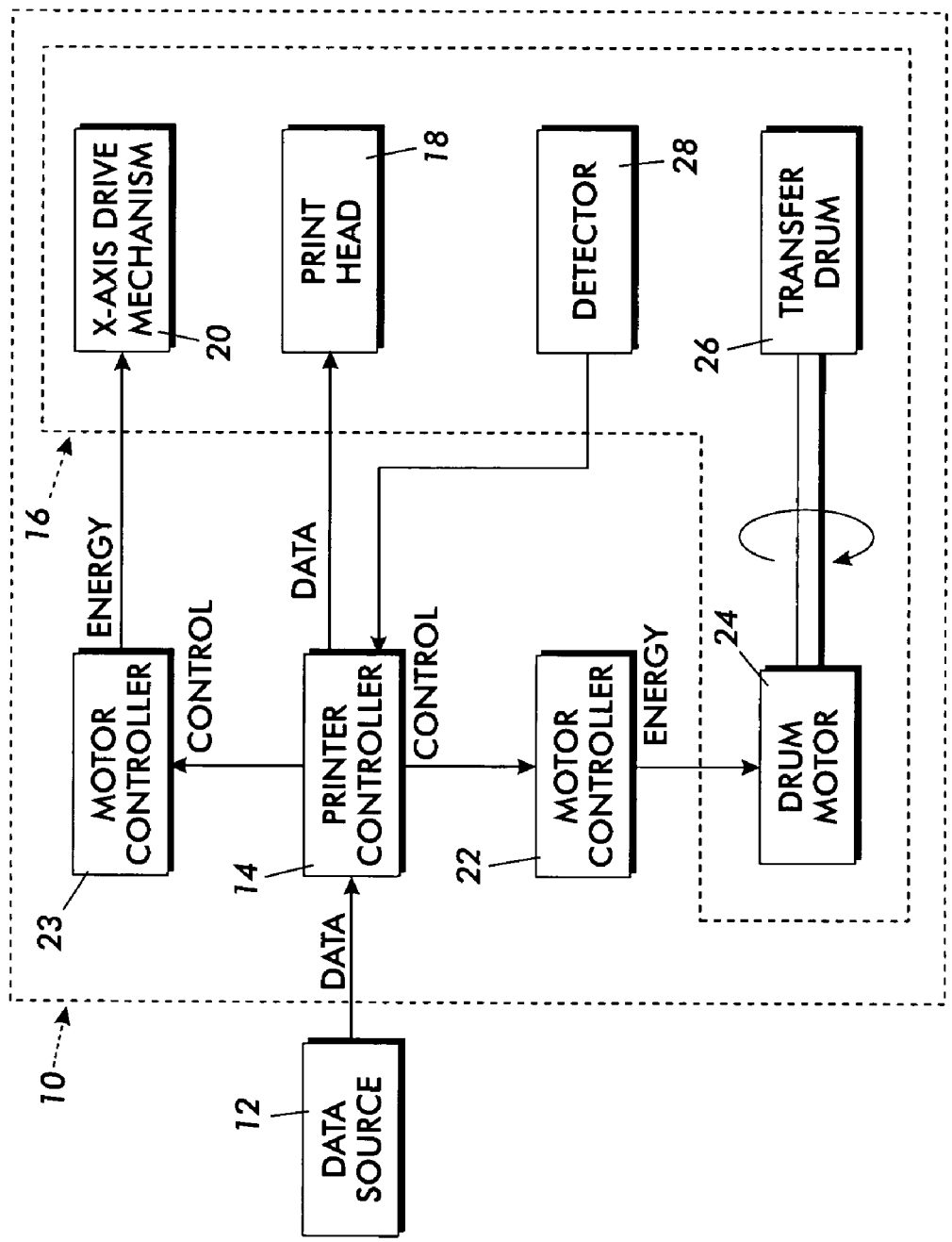
FIG. 1 shows a schematic block diagram of an exemplary offset printing apparatus.
Figure 3:
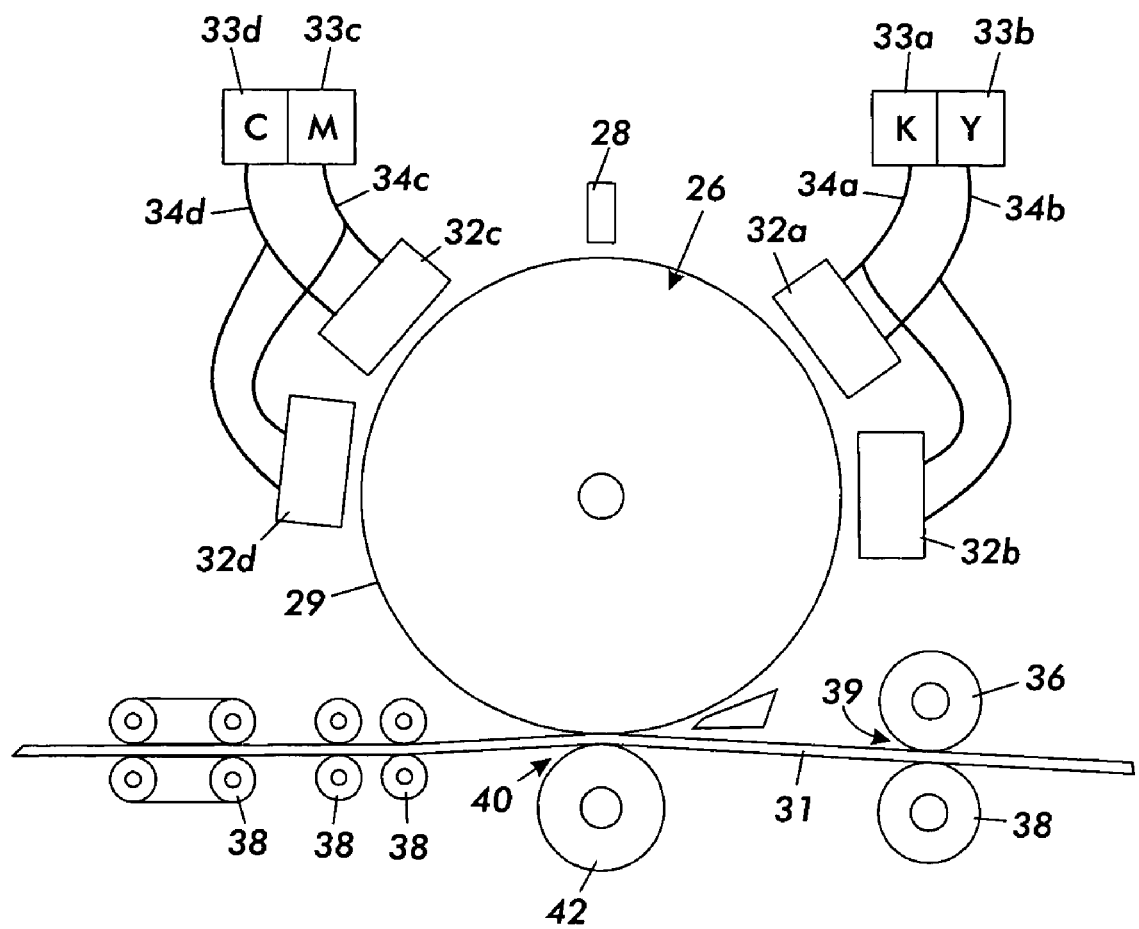
FIG. 3 shows a diagrammatic illustration of mechanical aspects of an exemplary print engine for an offset ink jet printing apparatus.
Figure 4:
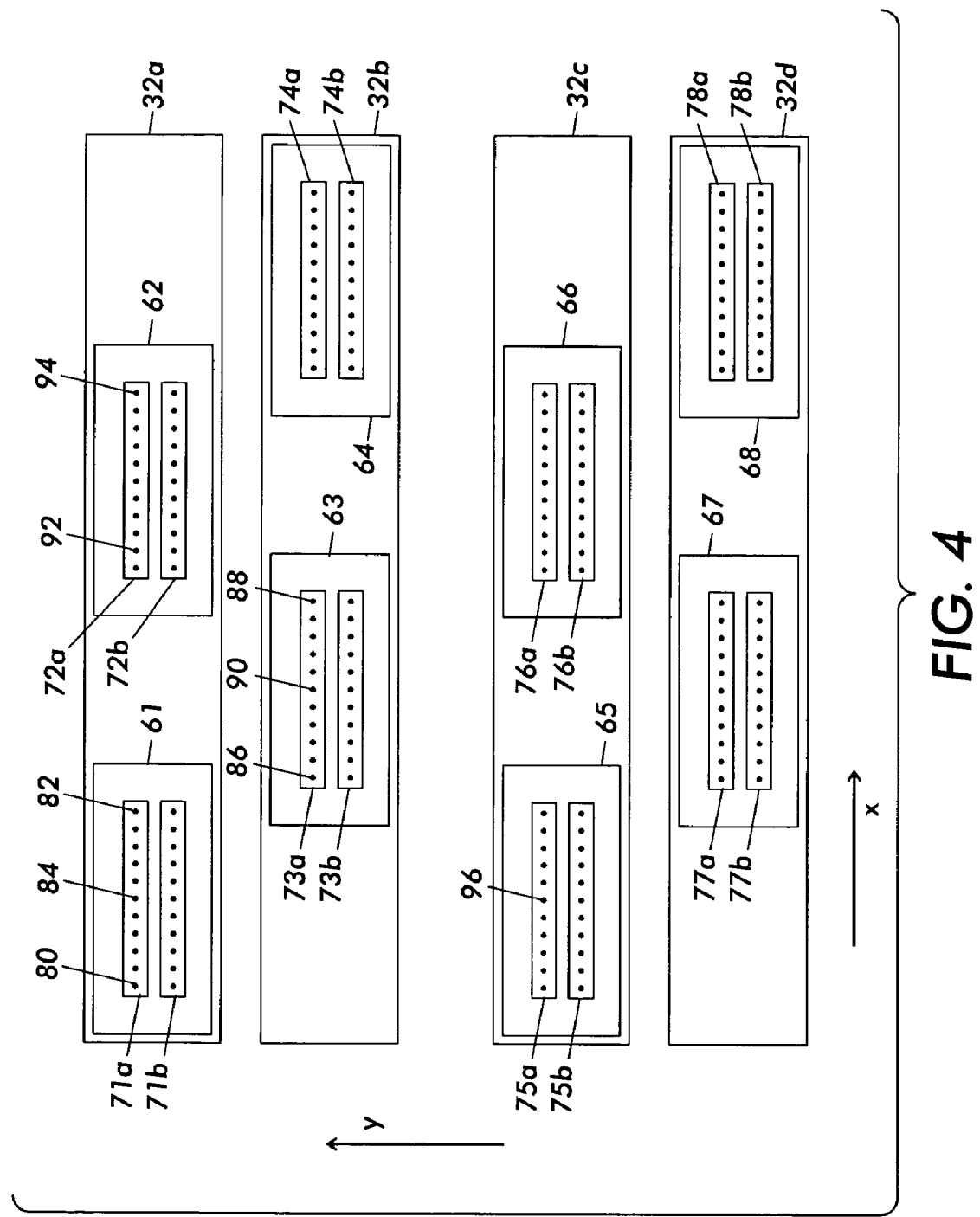
FIG. 4 shows an enlarged elevational view of four print head modules of the print engine of FIG. 3.

FIG. 1 shows a schematic block diagram of an exemplary offset printing apparatus 10. In particular, the offset printing apparatus includes a detector 28 and a processing circuit in the form of a printer controller 14 that are configured to, among other things, measure alignment and/or registration between various jets of the printing apparatus. An example of various details of an offset printer which may be employed in the diagram of FIG. 1 are provided in U.S. Pat. No. 5,389,958 entitled IMAGING PROCESS, which is assigned to the assignee of the present invention. FIGS. 3 and 4 illustrate in further detail a nonlimiting example of the mechanical configuration of a print engine 16 that may be used in the printing apparatus 10. However, it will be appreciated that one or more of the inventive features described herein may be incorporated on any printing apparatus in which alignment and/or registration between jets of one or more print heads may be tested.

In addition to the printer controller 14, the printing apparatus 10 includes motor controllers 22 and 23, and a print engine 16. The print engine 16 comprises a print head array 18, an X-axis drive mechanism 20, a drum motor 24, a transfer drum 26 and the optical detector 28. The motor controller 22 is configured to control the operation of the drum motor 24 and the motor controller 23 is operable to control the operation of the X-axis drive mechanism 20. The drum motor 24 is operably connected to impart rotational force to the transfer drum 26. The X-axis drive mechanism 20 imparts X-axis translational force to the X-axis drive mechanism 20. To this end, the X-axis drive mechanism 20 may suitably be a stepper motor and belt mechanism, not shown, but which is well known. An example of such a mechanism is described in U.S. Pat. No. 5,949,452, which is incorporated herein by reference.

The printer controller 14 is operable to control the operation of the print head array 18 as well as provide control signals to the motor controllers 22 and 23. The print head array 18 comprises one or more print heads having a number of ink ejecting jets. In many embodiments, the print head array 18 includes jets that print or eject a plurality of color inks. However, the printing apparatus 10 may alternatively be a monochromatic printing apparatus that includes only black ink ejecting jets. FIG. 4, described further below, illustrates an exemplary print head array 18 that includes eight print heads.

In normal printing operation, the printer controller 14 receives imaging data from a data source 12. The data source 12 may suitably be a separate computing device, among other things. The printer controller 14 processes the imaging data and controls the operation of the print engine 16 accordingly.

In particular, the printer controller 14 provides formatted imaging data to the print head array 18 and controls the movement of the print head(s) by providing control data to the motor controllers 22 and 23. The print head array 18 causes select ink jets to be fired, thereby releasing a controlled quantity ink in specific locations, in accordance with the formatted imaging data. In coordination with the firing of the ink jets, the motor controller 22 controls the operation of the drum motor 24 to impart controlled rotational or Y-axis movement to the drum 26 while the motor controller 23 controls the operation of the X-axis drive mechanism 20 to control the X-axis movement of the print head array 18.

It will be appreciated that if multiple print heads are employed, the motor controller 23 and the X-axis displacement mechanism 18 may be capable of providing independent X-axis displacement to one or more sets of the print heads.

In any event, the coordination of the Y-axis movement of the drum 26, X-axis movement of the X-axis drive mechanism 20, and firing of the jets in the print head array 18 cause a predetermined image to be imparted onto the transfer drum 26. The drum 26 is then contacted with a final receiving medium (see, e.g. FIG. 3), to transfer the ink image onto the receiving medium.

It is advantageous from time to time to test or measure the vertical and/or horizontal alignment of jets within the print head(s) of the print head array 18. In performing such an alignment/registration measurement, the printer controller 14 receives data representative of a request to perform one or more alignment registration operations from the data source 12, or another data source, not shown. For example, the printer controller 14 may be coupled to external user input devices, not shown, that provide commands to the printer controller 14. Such external user input devices may provide the commands that cause the printer controller 14 to receive alignment/registration measurement requests.

Figure 2A:
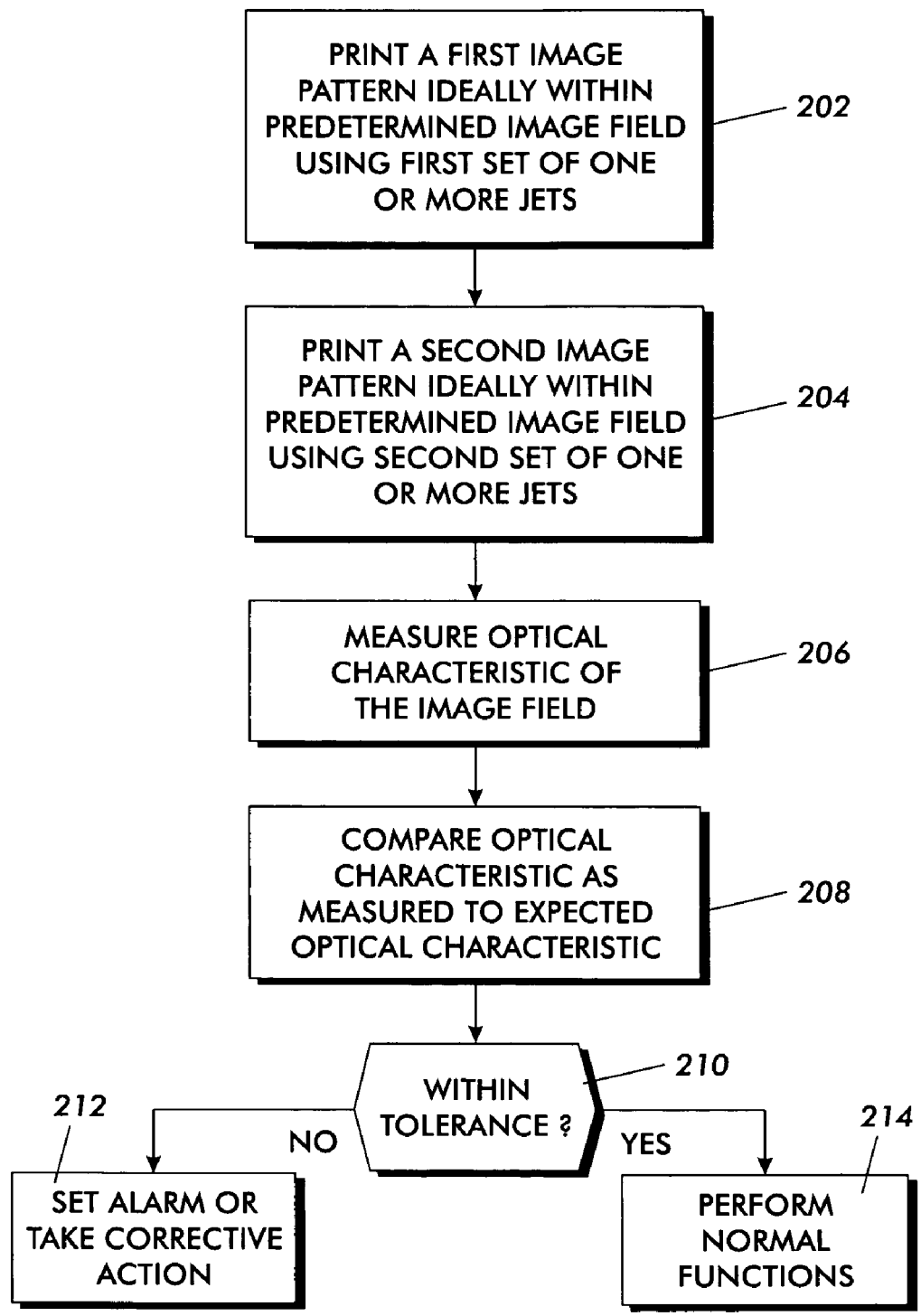
FIG. 2a shows a flow diagram of a first set of operations of a printing apparatus.

In response to a request or command to test alignment, the printer controller 14 executes the operations of FIG. 2a to perform the alignment test. In particular, in step 202, the printer controller 14 provides appropriate control signals to the print head array 18, the motor controller 22 and the motor controller 23 to cause a first set of one or more nozzles to print a first image pattern at least partially within an image field. Each nozzle of the first set operable to print a single image pixel at a time.

Thereafter, in step 204, the printer controller 14 thereafter provides appropriate control signals to cause a second set of one or more nozzles to print a second image pattern at least partially within the image field. Each nozzle of the second set is also operable to print a single image pixel at a time. The printer controller 14 provides signals such that the first and second images ideally will result in a predetermined pattern, such as an interference pattern, which has a known ideal optical characteristic. Typically, the predetermined pattern will have a height and width exceeding the dimensions of a single pixel. Misalignment of the print heads or jets will result in an actual optical characteristic that varies from the ideal.

In step 206, the printer controller 14 receives optical measurements of a select optical characteristic of the image field from the optical detector 28. To obtain measurements of the select image field, the optical detector 28 must be aligned with the image field. To this end, the printer controller 14 causes the motor controller 22 to rotate the drum until the image field is in Y-axis alignment with the detector 28. The printer controller 14 also causes the optical detector 28 to move in the X-axis direction until it is aligned with the printed image field. To allow for such movement of the detector 28, a separate X-axis displacement mechanism and motor controller, not shown, may be included.

Once the optical detector 28 is aligned with the image field, then the printer controller 14 may obtain one or more measurements of an optical characteristic of the image field.

The optical characteristic may, for example, be an overall optical density or luminance. In such a case, the optical detector 28 can suitably include a densitometer or the like. The optical characteristic may also be, in the case of a color printing apparatus, an overall color hue or chrominance value, in which case the optical detector 28 would include a calorimeter. As discussed above, the first and second images ideally form a composite pattern, such as an interference pattern, which has a known ideal optical characteristic. The ideal optical characteristic may be determined experimentally or empirically, but in any event represents the overall characteristic of the composite image pattern where the first and second image patterns are substantially in alignment with each other.

In step 208, the printer controller 14 compares the measured optical characteristic to the ideal optical characteristic. If the first set of jets and the second set of jets are properly aligned, then the measured optical characteristic will be substantially equal to the ideal optical characteristic. To the extent that the first set of jets and the second set of jets are misaligned in a particular manner, for example, they do not align properly in the Y-axis direction or they do not align properly in the X-axis direction, then the measured optical characteristic will differ from the ideal optical characteristic.

In step 210, the printer controller 14 determines whether the difference or error between the ideal optical characteristic and the measured optical characteristic is within an acceptable range or tolerance. If the error is beyond a threshold, the printer controller 14 may signal an error or attempt to correct the error in step 212. Correction of the error may be accomplished by adjusting the X-axis registration of the relevant print head or adjusting the timing of the firing of the certain jets in the relevant print head. If the error is merely signaled, then mechanical adjustments to the print head array 18 may be made. However, if in step 210 it is determined that the error is within tolerance, then the printer controller 14 may return to normal printing operations, as represented by step 214.

The above operations may be used to detect different types of misalignment, such as horizontal misalignment, vertical misalignment, and even print head skew. The printer controller 14 employs different ideal image patterns to detect different types of misalignment, as discussed further below in connection with FIGS. 5 through 10.

Figure 2B:
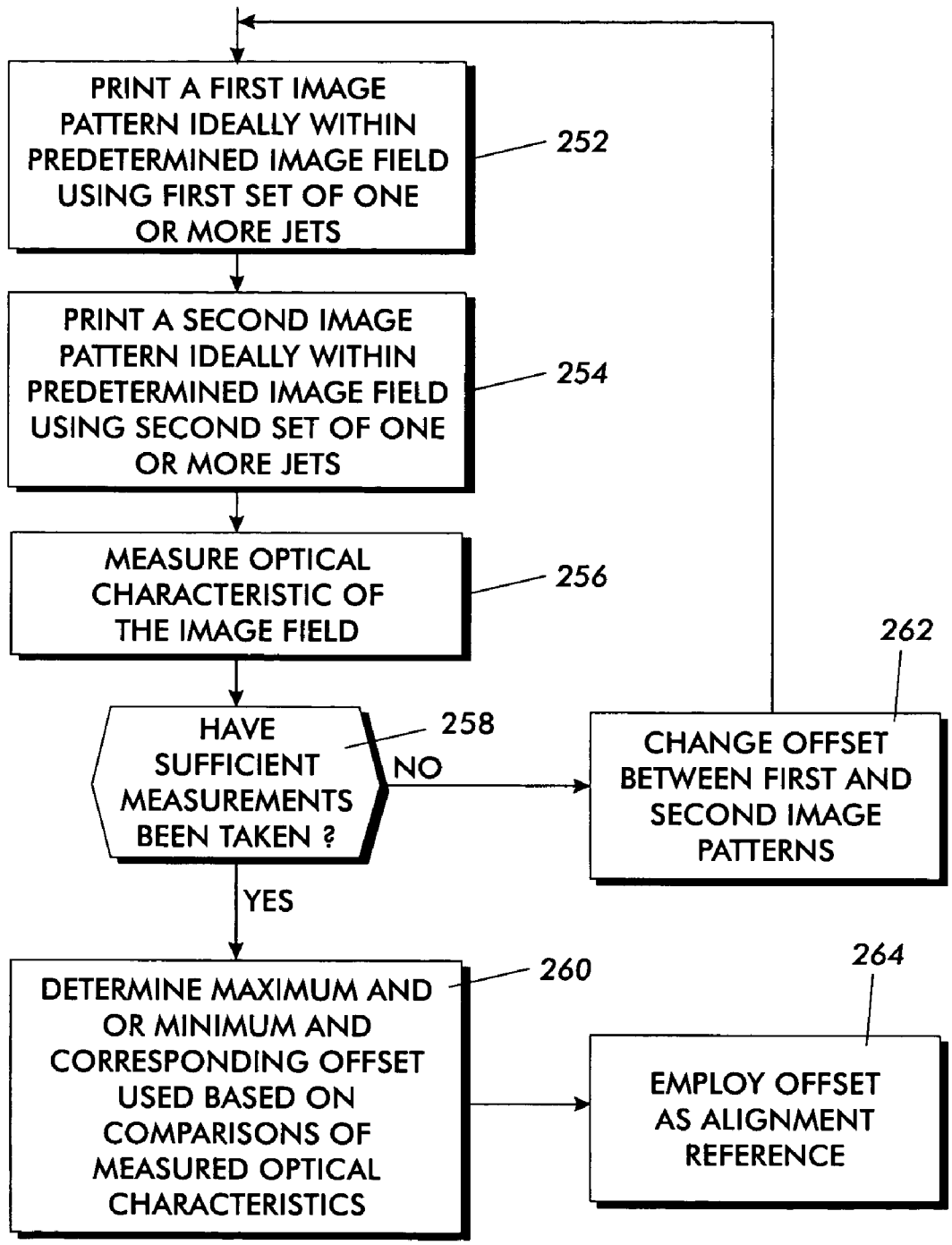
FIG. 2b shows a flow diagram of a second set of operations of a printing apparatus.

FIG. 2b shows an alternative method that may be executed by the printer controller 14. The printer controller 14 may perform the steps of FIG. 2b in carrying out one or more alignment tests in response to a signal requesting such test(s).

FIG. 2b illustrates a method in which the ideal or reference optical characteristic is not known, but rather is determined inherently by printing and measuring multiple composite image patterns in which the offset between the first and second image patterns is varied. In particular the printer controller obtains several measurements using several different offsets between the first image pattern and the second image pattern in order to identify the offset value that yields a minimum or maximum optical characteristic. It is noted that if the first and second image patterns are completely superimposed (i.e. one on top of the other), then the density value will have a minimum value (because white space in the composite pattern is maximized. Alternatively, if the first and second image patterns are completely complementary (i.e. one filling in the white space of the other), then the density will have a maximum value. Accordingly, the determination of the maximum or minimum density value may be used to determine what offset is necessary to achieve proper alignment of the first and second sets of nozzles.

In particular, in step 252, the printer controller 14 provides appropriate control signals to the print head array 18, the motor controller 22 and the motor controller 23 to cause a first set of one or more nozzles to print a first image pattern at least partially within an image field. Each nozzle of the first set operable to print a single image pixel at a time.

Thereafter, in step 254, the printer controller 14 thereafter provides appropriate control signals to cause a second set of one or more nozzles to print a second image pattern at least partially within the image field, using a select offset. The select offset represents an X-axis or Y-axis adjustment to the relative alignment between the first set and second set of nozzles. The printer controller 14 provides signals such that the first and second images ideally will result in a predetermined pattern, with a select offset between the first and second image patterns. The amount of offset, combined with the existing alignment error, will affect the degree to which the first and second image patterns overlap. The degree of overlap will, in turn, affect the overall density measurement of the optical characteristic of within the image field.

In step 256, the printer controller 14 receives optical measurements of a select optical characteristic of the image field from the optical detector 28. To this end, as with step 206 discussed above in connection with FIG. 2a, the printer controller 14 causes the optical detector 28 to be aligned with the image field. Once the optical detector 28 is aligned with the image field, then the printer controller 14 may obtain one or more measurements of an optical characteristic of the image field.

Thereafter, in step 258, the printer controller 14 determines whether a sufficient number of measurements at different offset values have been taken. Specifically, the printer controller 14 ideally takes several measurements, i.e. repeats steps 252, 254 and 256 using several different offset values in order to increase the number of data points from which a maximum (or minimum) measured optical characteristic may be determined.

If the answer in step 258 is in the affirmative, then the printer controller 14 proceeds to step 260. If not, then the printer controller 14 changes the offset value in step 262 and then returns to step 252 to print and ultimately measure a new set of image patterns.

In step 260, after a sufficient number of measurements have been taken using various offset values, the printer controller 14 determines the maximum and/or minimum measured optical characteristic based on comparisons of the measurements. The maximum or minimum value typically corresponds to an offset in which the first and second set of nozzles are closest to being properly aligned, as discussed above.

After step 260, the printer controller 14 proceeds to step 264. In step 264, the printer controller 14 uses the offset value that corresponds to the minimum (or maximum) measured optical characteristic to determine an offset adjustment to correct for any alignment errors between the first and second sets of nozzles.

Accordingly, as illustrated by FIGS. 2a and 2b, the first and second image patterns are useful in determining alignment error or offset. By comparing a measured overall optical characteristic of the composite image pattern to another reference optical characteristic (whether to determine a maximum or minimum, or to determine a difference from an ideal optical characteristic), the need for high precision image analysis to correct and/or identify alignment issue is reduced.

FIG. 3 shows a diagrammatic illustration of mechanical aspects of an exemplary print engine that may be used as the print engine 16 of the printing apparatus of FIG. 1. The print engine 16 includes addition mechanical elements not illustrated in FIG. 1. In general, the print engine 16 operates to place a plurality of ink drops in an image-wise fashion in a final receiving substrate or medium 31.

Four print head modules 32a–32d which contain the print head array 18 are positioned around the drum 26. The print head modules 32a–32d operate to jet drops of ink onto an intermediate surface 29 on drum 26. The print head modules 32a–32d are each capable of independently controlled X-axis movement. FIG. 4 shows an elevational view of the four print head modules 32a–32d. As shown in FIG. 4, the print head array 18 includes eight print heads 61–68 arranged in pairs on the print head modules 32a–32d. Each print head 61–68 is located in one of four X-axis print head positions in the print head array and in one of four Y-axis print head positions in the print head array.

Referring specifically to FIG. 4, the positioning of the print heads 61–68 exemplifies a staggered full width array printing arrangement. The staggered full width array printing arrangement provides certain advantages by balancing cost and performance issues in an advantageous manner, as discussed further above.

The first print head module 32a contains a first print head 61 and a second print head 62. The first print head 61 contains two rows of jets 71a and 71b. Each jet in the first row of jets 71a is configured to eject black ink, while each jet in the second row of jets 71b is configured to eject yellow ink. The second print head 62 similarly contains a row of black ink ejecting jets 72a and a row of yellow ink ejecting jets 72b. Ideally, the rows of jets 71a and 72a are aligned in the same vertical or Y-axis position. Similarly, the rows of jets 71b and 72b are aligned in the same Y-axis position.

The second print head module 32b also contains a first print head 63 and a second print head 64. The first print head 63 contains a row of black ink ejecting jets 73a and a row of yellow ink ejecting jets 73b. The second print head 64 similarly contains a row of black ink ejecting jets 74a and a row of yellow ink ejecting jets 74b. Similar to the first print head module 32a, the rows of jets 73a and 74a are aligned in the same vertical or Y-axis position, and the rows of jets 73b and 74b are aligned in the same Y-axis position.

Together, the rows of black ink ejecting jets 71a–74a span nearly the entire X-axis length, hence the use of the terminology "full width array". As discussed further above, the use of a full width array increases print speed because it reduces or eliminates the need for X-axis directional scanning. However, in the embodiment described herein, at least some X-axis directional scanning is employed in order to achieve high levels of resolution without the expense of having an ink jet for every pixel of resolution. As discussed further above, resolution may be increased for a certain number of jets by using spaced apart jets that are printed using interleaving over several passes of the drum. Using this method, a six hundred DPI printing apparatus may use significantly less than six hundred ink jets per inch, as would be required in a single pass printing apparatus. In some embodiments, the print heads 61–64 each contain one hundred fifty ink jets per inch, thereby requiring four passes of interleaved printing to the drum 26 to achieve a final 600 DPI image.

Nevertheless, it will be appreciated that in FIG. 4, each print head 61–68 is shown to include only eleven jets per row for clarity of exposition. Actual print heads will typically contain many more jets. Nevertheless, regardless of the actual number of jets, each row of jets will contain a left-most or first jet, a right-most or last jet, and a plurality of interior jets. For example, the row 71a of the print head 61 includes a first jet 80, a last jet 82, and a plurality of interior jets exemplified by the interior jet 84. The row 73a of the print head 63 likewise includes a first jet 86, a last jet 88, and a plurality of interior jets exemplified by the interior jet 90. Similarly, the row 72a of the print head 62 includes a first jet 92, a last jet 94 and a plurality of interior jets.

As shown in FIG. 4, the print heads 61–64 are staggered such that rows 71a and 72a are located at a different Y-axis position than the rows 73a and 74a. Moreover, the last jet 82 of row 71a is in an X-axis position adjacent to the first jet 86 of row 73a. Similarly the last jet 88 of row 73a is in an X-axis position adjacent to the first jet 92 of row 72a. Finally, the last jet 94a of row 72a is in an X-axis position adjacent to the first jet of the row 74a.

Thus, to print a horizontal line, the jets of rows 71a and 72a would fire simultaneously when the rows 71a and 72a are aligned in a particular Y-axis position with respect to the drum 26. To continue the image on that same Y-axis position, the jets of rows 73a and 74a fire their jets when those rows become aligned with that same Y-axis position. After a single pass of the rows 71a, 72a, 73a, and 74a, however, only a portion of the image on the select line is printed, due to the interleaved nature of the printing. Thus, to continue printing the horizontal line, the drum 26 again rotates until rows 71a and 72a are again aligned in the select Y-axis position. However, the rows 71a and 72a have been slightly moved in the X-axis direction to achieve interleaving. The jets of rows 71a and 72a then fire. The drum 26 again rotates until rows 73a and 74a are aligned, at which point the jets of those rows are fired. The process continues until a complete interleaving cycle is completed. If all of the print heads 61–64 are properly aligned, a single, relatively continuous horizontal line of ink should be present on the drum 26.

As a result, the alignment of the print heads 61–64 with respect to each other, as well as the timing of the printing of the rows 71a–74a with respect to the rotation of the drum 26, must be carefully controlled. Misalignment or incorrect timing may result in visible seams in the printed image that appear at the intersection of the rows 71a and 73a, the intersection of rows 73a and 72a and the intersection of rows 72a and 74a. Similar issues exist with respect to the yellow ink ejecting rows 71b–74b.

Referring now to the third print head module 32c and the four print head module 32d, those modules 32c and 32d are configured in an analogous manner as the first and second print head modules 32a and 32b, except that the third and fourth print head modules 32c and 32d cooperate to eject magenta and cyan ink instead of black and yellow ink. Accordingly, the third print head module 32c includes two print heads 65, 66, each of the print heads 65, 66 containing a row of magenta ink ejecting jets 75a, 76a, respectively, and a row of cyan ink ejecting jets 75b, 76b, respectively. Similarly, the fourth print head module 32d includes two print heads 67, 68, each containing a row of magenta ink ejecting jets 77a, 78a, respectively, and a row of cyan ink ejecting jets 77b, 78b, respectively. The print heads 65–68 have row alignment issues similar to those of the print heads 61–64 discussed above.

An additional alignment issue concerns the X-axis alignment of jets between print heads that are in the same horizontal position m. For example, the jets of print head 61 must be aligned in the X-axis direction with the jets of print head 65. Specifically, the interior jets of row 71a must be aligned horizontally with the jets of the same relative horizontal position in row 75a of print head 65. Thus, for example, if the interior jet 84 of row 71a is assumed to be in the nth horizontal jet position in the print head 61, then an interior jet 96 in the nth horizontal jet position of row 75a of the print head 65 must be aligned horizontally with the interior jet 84. Without proper alignment, the mixing of the color inks and the resulting hues could potentially be inaccurate, causing unwanted color distortion, streaks and banding in the final image.

For the same reasons, the jets of print head 62 must be aligned in the X-axis direction with the jets of print head 66, the jets of print head 63 must be aligned in the X-axis direction with the jets of print head 67, and the jets of print head 64 must be aligned in the X-axis direction with the jets of print head 68.

Referring again to the general mechanical structure of the printing engine 16 shown in FIG. 3, it can be seen that the print head modules 32a–32d are coupled to corresponding ink sources 33a–33d through ink conduits 34a–34d. In particular, the conduit 34a connects the black ink source 33a to each of the print head modules 32a and 32b, while the conduit 34b also connects the yellow ink source 33b to each of the print head modules 32a and 32b. Similarly, the conduit 34c connects the magenta ink source 33c to each of the print head modules 32c and 32d and the conduit 34d connects the cyan ink source to each of the print head modules 32c and 32d.

In the embodiment described herein, the ink sources 33a–33d are solid ink sources, or phase-change ink sources, which are known in the art. However, other types of ink sources may instead be employed, such as powdered ink or liquid ink sources. Such ink sources, as well as mechanisms for their delivery to the print heads 61–68 (see FIG. 4) of the print head modules 32a–32d, are well known in the art.

In general printing operations, the image to be printed is transferred to the surface 29 of the drum 26 by the print heads 61–68 of the print head modules 32a–32d. To this end, the drum 26 rotates through multiple revolutions in which the print heads 61–68 eject ink in an image-wise fashion in an interleaved manner, as discussed above. Once the completed image has been transferred in the form of liquid ink onto the drum 26, the final receiving media 31 is contacted with the surface 29 of the drum 26.

The advancement of the final receiving media 31 toward a position in which it may contact the drum 26 is defined in part by pairs of opposing guide rollers and tensioners 38. The final receiving medium 31 thereafter advances through a transfer nip 40 defined between the drum 26 and a transfer roller 42. Suitable materials for the drum 26 and transfer roller are known in the art, examples of which are described in U.S. Pat. No. 6,113,231. The transfer roller 42 engages the medium 31 on the reverse side to which the ink image is transferred from the exposed surface of the intermediate transfer surface 29. As the media 31 passes through the nip 40, it is pressed against the deposited ink image to transfer the ink image to the media 31.

The pressure exerted on the ink image and media 31 within the transfer nip 40 should be sufficient to insure that the ink image is transferred to the media 31. Additional processing of the transferred ink image on the media 31 may be accomplished by a pair of post-processing rollers 36, 38 downstream from the transfer nip 40. The post-processing rollers 36, 38 create a fusing nip 39 for fusing or fixing the ink image to the media 31. Typically, the pressure within the fusing nip 39 is much greater than the pressure within the transfer nip 40. In this manner, the transfer nip 40 may employ less pressure than is necessary to permanently fix the ink image. The use of less pressure in the transfer nip 40 is advantageous because greater pressure increases the possibility of misalignment of the drum 26 with respect to the print head modules 32a–32d.

In alignment measurement operations discussed herein, no final printing media is necessary because the optical detector 28 is configured to obtain optical measurements from the intermediate transfer surface 29 of the drum 26. In general, during test procedures, one or more of the print heads 61–68 of print head modules 32a–32d print test images or patterns onto the intermediate transfer surface 29. The optical detector 28 obtains an optical measurement directly from the intermediate transfer surface 29 and provides the data to the printer controller 14 (see FIG. 1).

FIGS. 5–10 illustrate in further detail the operations of the printer controller 14 in the performance of various alignment measurement operations. Specifically, FIGS. 5, 7, 8 and 10 illustrate exemplary embodiments of the operations described above in connection with FIG. 2a, while FIGS. 6a–6d and 9a–9d show exemplary image patterns that may be employed.

Figure 5:
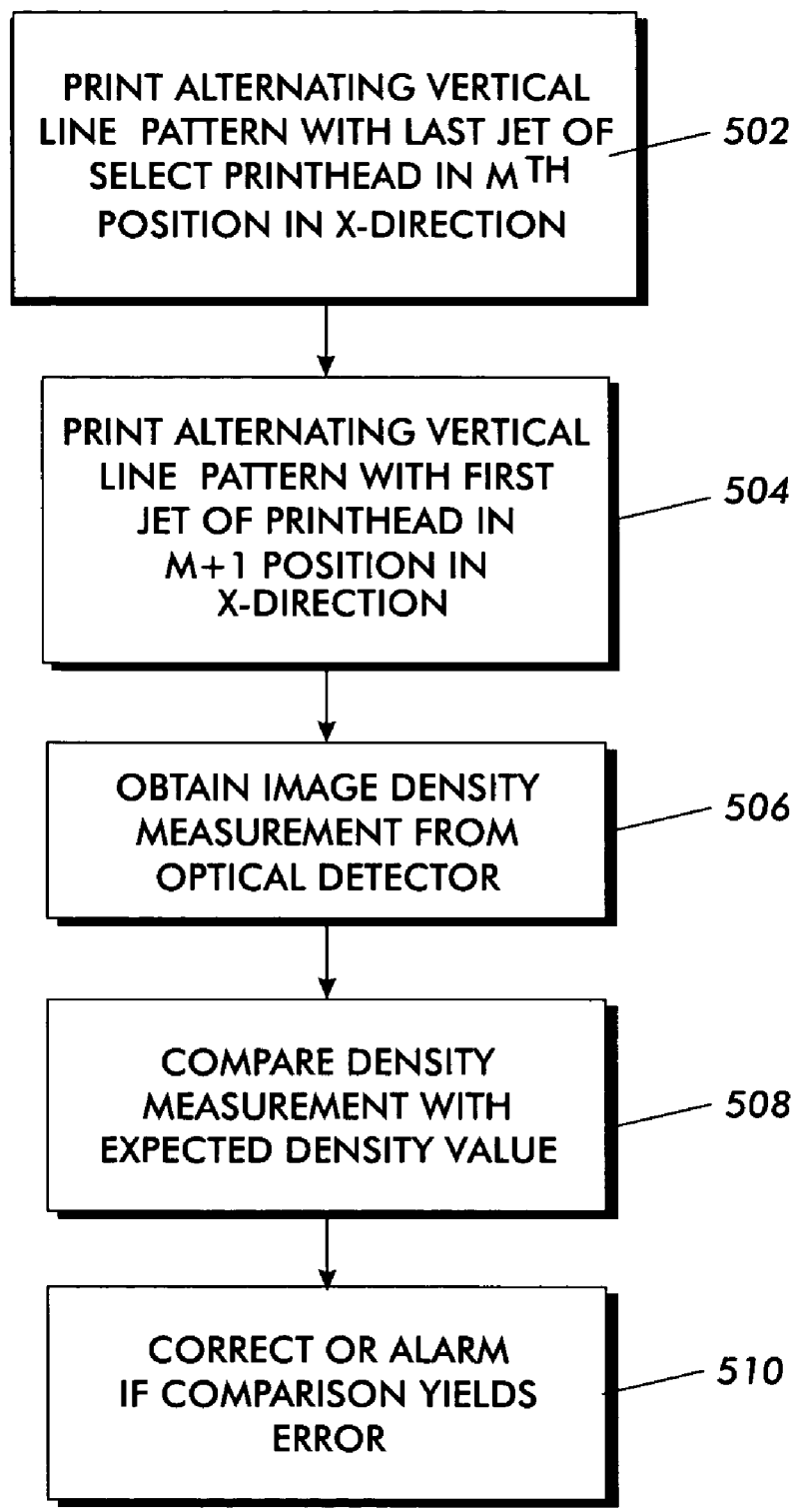
FIG. 5 shows a flow diagram of the operations of the offset printing apparatus of FIG. 1 in performing a first exemplary horizontal alignment measurement.

FIG. 5 shows an exemplary first alignment measurement operation which can be employed by the printing apparatus 10 as well as other printing apparatus. Exemplary execution of the flow diagram of FIG. 5 will be described in relation to the printing apparatus illustrated in FIGS. 1, 2 and 4.

The first alignment measurement operation tests for horizontal alignment of jets from different print heads in a staggered print head array such as that shown in FIG. 4. By horizontal alignment, it is meant that the jets from the different print heads are arranged to eject ink at the appropriate position in the X-axis direction. If the different print heads are mis-aligned in this direction, then the transition from the last jet of one print head to the first jet of the next print head will not be smooth, or in other words, the image will not be seamless. Such errors may occur due to mechanical misalignment of the heads, and often may be corrected using software corrections. In particular, because the print head modules 32a–32d are capable of some X-axis translation, error in the X-axis alignment between print heads may be compensated by using the X-axis translation of one or more print heads to achieve alignment of the print heads.

Figure 6A:
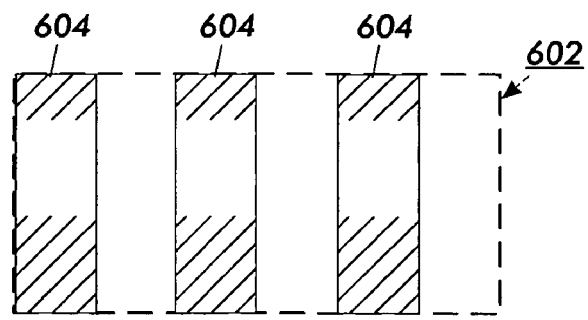
FIGS. 6a–6d show exemplary vertical line image patterns that may be generated by a printing apparatus disclosed herein.

In general, in step 502, the printer controller 14 causes a select print head, located in an X-axis print head position m, to print an alternating vertical line pattern using only its last jet. FIG. 6a, discussed further below, shows an example of an alternating vertical line pattern that may be printed in step 502. The printer controller 14 provides suitable control signals to the print head array 18 and the motor controllers 22, 23 to cause the pattern to fall nominally within a predetermined image field. The size of the image field typically will correspond to the field of view of the optical sensor 28. To print the image pattern, the printer controller 14 causes the last jet of the select print head to selectively eject ink over several rotations of the drum, providing for the necessary X-axis translation between passes to obtain the alternating line pattern.

By way of example, the printer controller 14 could in step 502 cause the last jet 82 of the row 71a to print an alternating vertical line pattern such as is shown in FIG. 6a. FIG. 6a shows an image field 602 having a plurality of alternating vertical lines 604.

In step 504, the printer controller 14 causes the first jet of the next adjacent print head to print an alternating vertical line pattern using only its last jet. By next adjacent print head, it is meant the print head in the m+1 print head horizontal position. The alternating vertical line pattern is identical to and nominally located in the same image field as the vertical line pattern created in step 502. Accordingly, the image field in step 502 must be chosen such that both the last jet of the print head in position m and the first jet of the print head in position m+1 nominally possess the X-axis displacement range to print over the same image field.

Thus, similar to step 502, the printer controller 14 provides suitable control signals to the print head array 18 and the motor controllers 22, 23 to cause the pattern formed in step 504 to fall nominally within a predetermined image field.

Figure 6B:
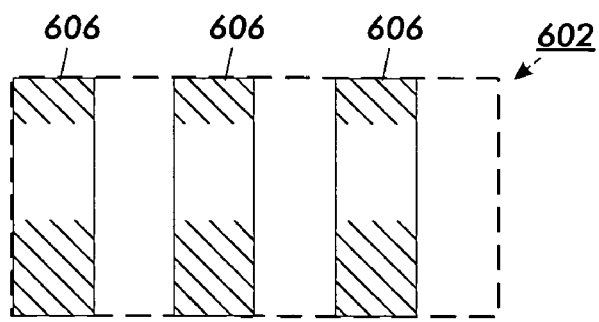

Continuing with the example discussed above in connection with FIG. 6*a*, the printer controller 14 could in step 504 cause the first jet 86 of the row 73*a* to print an alternating vertical line pattern such as is shown in FIG. 6*b*. FIG. 6*b* represents the alternating vertical line image pattern 606 formed in step 504 as if it were printed on a blank surface. However, the image pattern 606 is intended to be printed on the drum 26 in the image field 602 in which the image pattern 604 already resides.

Figure 6C:
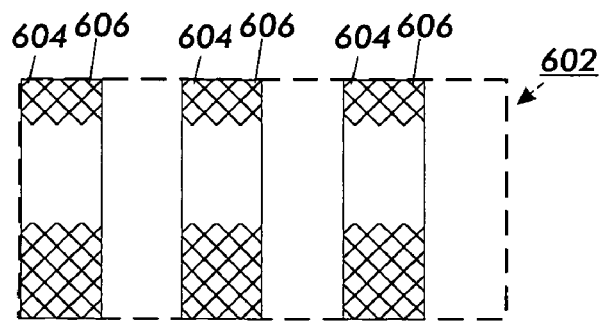
Figure 6D:
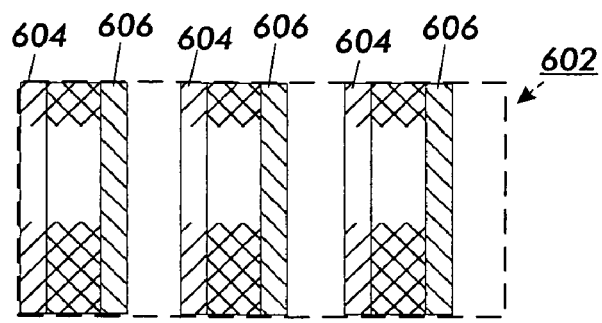

FIGS. 6*c* and 6*d* illustrate prophetic examples of the composite image resulting from the printing of the image patterns 604 and 606 in steps 502 and 504, respectively. If the X-axis alignment between the last jet 82 of row 71*a* and the first jet 86 of row 73*a* are relatively well-aligned, the image pattern 606 will be substantially fully superimposed on the image pattern 604, as shown in FIG. 6*c*. If, however, the relative X-axis positioning of the jet 82 and the jet 86 is somewhat misaligned, then the image pattern 606 will be somewhat offset with respect to the image pattern 604, as shown in FIG. 6*d*.

Referring again to FIG. 5, after step 504, a composite image exists on the drum 26 that is substantially located within the image field. The printer controller 14 thereafter proceeds to step 506. In step 506, the printer controller 14 receives from the optical detector 28 a signal representative of an average or overall density of the image field. To this end, the printer controller 14 controls the rotation of the drum 26 and the X-axis displacement of the optical detector 28 such that the measurement field of vision of the optical detector 28 aligns with the image field. Once the optical detector 28 is aligned, the printer controller 14 obtains sensor signals from the detector 28 that are representative of the density of the image within the field of vision of the optical detector 28, and hence the image field.

Using methods described herein, the optical detector 28 may have a resolution that is not suitable for obtaining actual image details at single pixel resolution, but is nevertheless capable of obtaining an overall density measurement (i.e. average density measurement) of an area the size of the image field. Despite the lack of resolution, such a measurement would nevertheless contain information regarding the relative alignment of the two print heads. Specifically, because errors in horizontal alignment affect the actual composite image pattern (e.g. compare FIGS. 6*c* and 6*d*), errors in alignment will affect the measured density value a corresponding amount.

Continuing in the example discussed above in connection with FIGS. 6*a* to 6*d*, it will be appreciated that the measured density value of the composite image in FIG. 6*d*, in which the jets 82 and 86 were assumed not to be properly aligned, will differ from the measured density value of the composite image in FIG. 6*c*, in which the jets 82 and 86 were assumed to be properly aligned.

Referring again to FIG. 5, after the printer controller 14 obtains from the optical sensor 28 the measured density value of the image field, the printer controller proceeds to step 508.

In step 508, the printer controller 14 compares the measured density value with the expected density value. The expected density value is based on the composite pattern assuming no misalignment. For example, in the example shown in FIGS. 6*a*–6*d*, the printer controller 14 attempted to cause identical patterns 604 and 606 to be printed in the same location, in other words, superimposed upon each other. Thus, the expected density value would be the value corresponding to the image illustrated in FIG. 6*c*.

However, it will be appreciated that the printer controller 14 can instead attempt to cause the patterns 604 and 606 to be ideally complementary, such that in the ideal, the entire image field 602 would be fully covered with ink. In such a case, the expected density value would reflect the fully inked image field.

The printer controller 14 may obtain the expected image density value in a variety of ways. The printer controller 14 may be programmed with a priori information regarding an expected image density value, or obtain the information empirically during the measurement process. For example, if ideally superimposed images are printed in steps 502 and 504, as is the case in the example shown in FIGS. 6*a*–6*d*, then the printer controller 14 can be preprogrammed with an expected density value that is either based on calibration measurements made during the manufacturing process, or otherwise calculated theoretically for the expected image (i.e. one-half of the maximum density value if the image pattern occupies one-half of the image field).

Alternatively, the printer controller 14 may measure the image field density after step 502 and use the resulting value as the expected image density. In particular, if the image patterns created in steps 502 and 504 are ideally fully superimposed, then the measured density after step 502 should be equivalent to the image field density after step 504, assuming no misalignment. One advantage of measuring the density after step 502 to obtain the ideal density is that errors in the calibration of the detector 28 and errors in the absolute registration of the first print head do not have significant effect on the alignment measurement result.

In any event, after the printer controller 14 compares the expected density value to the measured density value in step 508, the printer controller 14 executes step 510. In step 510, the printer controller 14 either sets an alarm or attempts to correct the alignment if the comparison result of step 508 is indicative of an error that is beyond an acceptable threshold. To correct X-axis alignment errors between print heads, the X-axis reference alignment of one or more of print heads may be changed. For example, if the comparison yields a value that is representative of a 50 micron misalignment, then the X-axis reference of the print head in the m position may be moved 50 microns in future printing operations.

Thus, the above system provides a system and method for determining the X-axis alignment of print heads in adjacent X-axis positions without requiring a sensor that has sub-pixel or pixel imaging resolution. Such capabilities allow less expensive components to be employed for alignment testing.

Figure 7:
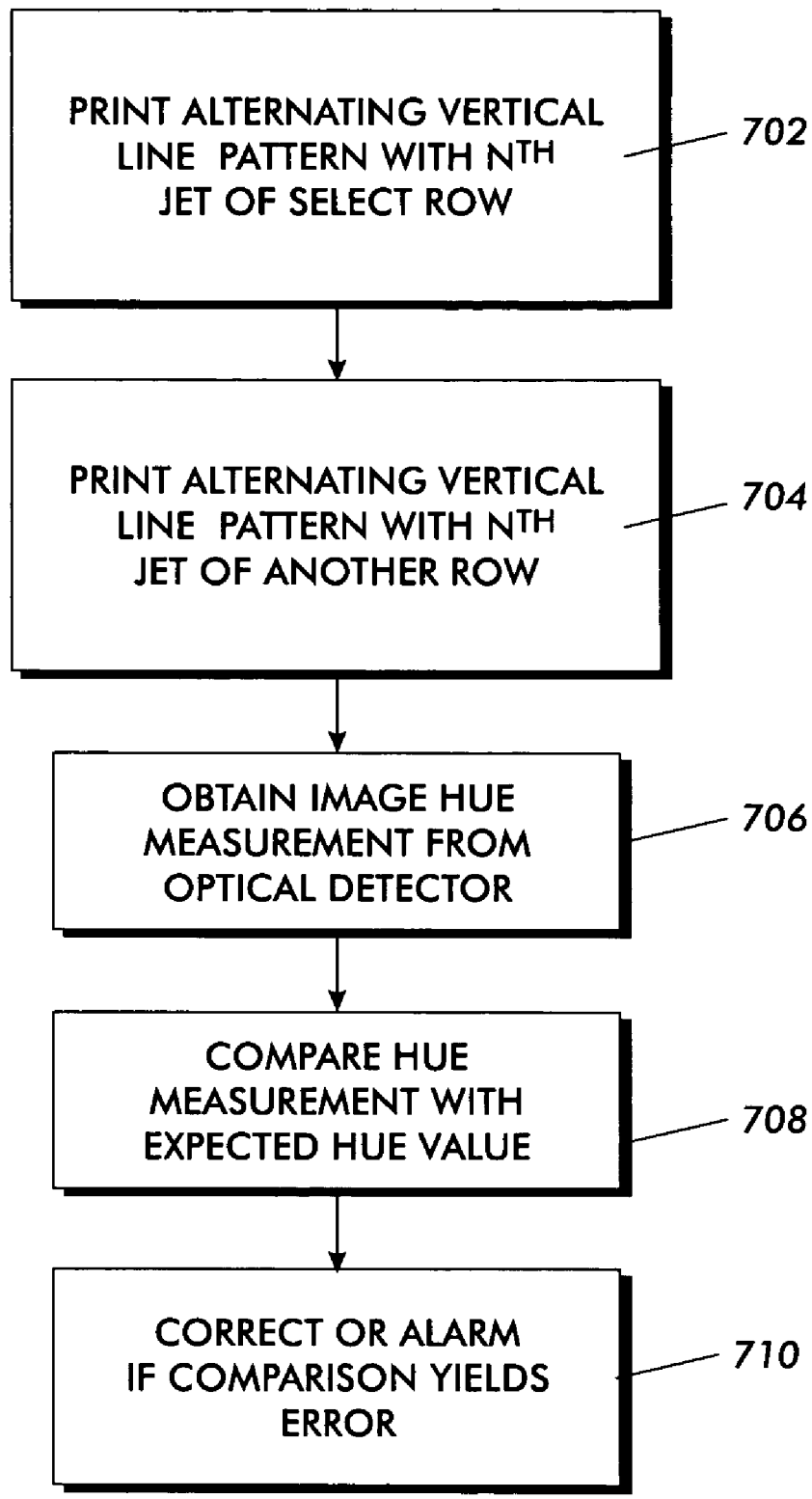
FIG. 7 shows a flow diagram of the operations of the offset printing apparatus of FIG. 1 in performing a second exemplary horizontal alignment measurement.

FIG. 7 shows an exemplary second alignment measurement operation that can be employed by the printing apparatus 10 as well as other printing apparatus. Exemplary execution of the flow diagram of FIG. 7 will be described in relation to the printing apparatus illustrated in FIGS. 1, 2 and 4.

The second alignment measurement operation tests for horizontal alignment of jets from different rows in any print head array. For example, the second alignment measurement can measure the horizontal alignment of the jet 84 of row 71*a* with respect to the jet 96 of the row 75*a* of the print head 65. In the embodiment described herein, the second alignment measurement operation effectively tests for horizontal alignment of jets that eject different color inks, because each row of jets prints differently colored inks. In other embodiments that include multiple rows of jets that print the same colored ink, such as that shown in U.S. Pat. No. 6,113,231, a similar horizontal alignment measurement operation could be carried out between different rows of jets that print the same colored inks.

Referring again to the exemplary embodiment described herein, if the different print heads 61–68 are mis-aligned in horizontal direction, then the hue or chroma accuracy of individual pixels will be distorted in printed images. For example, most color hues are created as combinations of the four color inks, black, yellow, magenta and cyan. If one or more jets from a row of jets that is configured to eject one color ink are misaligned in the X-axis direction with respect to correspondingly-located jets of another color ink in another row, then any color hue that requires mixtures of those inks will not print properly in those pixels that are printed by such misaligned jets.

Such misalignment errors may have a variety of causes. For example, in the print head array 18 of FIG. 4, inaccurate horizontal registration of the print head 65 with respect to the print head 61 can be a source of such errors. Correcting such errors involving color to color horizontal alignment may be corrected in the software executed by the printer controller 14. In particular, because the print head modules 32*a*–32*d* are capable of some X-axis translation, error in the X-axis alignment between various rows may be compensated by individually adjusting the X-axis positioning used for each row being printed.

In the general operation of the alignment measurement operation of FIG. 7, the printer controller 14 of step 702 causes a select jet in a specific horizontal jet position n of a select row of a print head to print an alternating vertical line pattern such as that shown in FIG. 6*a*. The printer controller 14 provides suitable control signals to the print head array 18 and the motor controllers 22, 23 to cause the pattern to fall nominally within a predetermined image field. As discussed above in connection with FIG. 5, the image field corresponds to the field of view of the optical sensor 28. To this end, the printer controller 14 causes the jet at the position n to selectively eject ink over several rotations of the drum 26, providing for the necessary X-axis translation between passes to obtain the alternating line pattern. It is noted that the image field must be chosen such that the jet at position n has sufficient range of X-axis translation to print the alternating line pattern in the image field.

For example, in step 702, the printer controller 14 could cause a select interior jet such as the interior jet 84 of the row 71*a* to print the alternating vertical line pattern 604 shown in FIG. 6*a*.

In step 704, the printer controller 14 causes another jet in the nth position of another row of jets to print an alternating vertical line pattern. The alternating vertical line pattern is identical to and nominally located in the same image field as the vertical line pattern created in step 702.

Thus, similar to step 702, the printer controller 14 provides suitable control signals to the print head array 18 and the motor controllers 22, 23 to cause the pattern formed in step 704 to fall nominally within the predetermined image field.

Thus, for example, the printer controller 14 could cause the jet 96 of the row 75*a* of the print head 65 to print an alternating vertical line pattern 606 represented in FIG. 6*b*. As a result of the step 704 of FIG. 7, the image field will contain a composite image that includes both of the vertical line patterns 604 and 606. The actual appearance of the composite image depends, however, on the actual horizontal alignment accuracy of the jets 84 and 96. FIG. 6*c* shows an example in which the composite image appears largely similar to the individual images 604 and 606 of FIGS. 6*a* and 6*b*, representative of a situation in which the jets 84 and 96 are properly aligned. FIG. 6*d* shows another example in which the composite image differs from the images 604 and 606 as a result of horizontal misalignment of the jets 84 and 96.

Referring again to FIG. 7, after step 704, a composite image exists on the drum 26 that is substantially located within the image field. The printer controller 14 thereafter in step 706 receives from the optical detector 28 a signal representative of an average or overall color (i.e. hue or chrominance) of the image field. To this end, the printer controller 14 operates in substantially the same manner as that described in connection with step 506, discussed above in connection with FIG. 5.

Analogous to the operation of FIG. 5, the optical detector 28 may have a resolution that is not suitable for obtaining actual pixel-level image details of the composite image, but is nevertheless capable of obtaining an overall color measurement (i.e. average hue or chrominance measurement) for the image field. Despite the lack of resolution, such a measurement would nevertheless contain information regarding the relative alignment of the two print heads. Specifically, because errors in horizontal alignment affect the actual composite image pattern (e.g. compare FIGS. 6*c* and 6*d*), errors in alignment will affect the measured color value a corresponding amount.

Continuing in the example discussed above, it will be appreciated that the measured color value of the composite image in FIG. 6*d*, in which the jets 84 and 96 are assumed not to be properly aligned, will include a significant magenta element. By contrast, the measured color value of the composite image in FIG. 6*c*, in which the jets 82 and 86 are assumed to be properly aligned, will be nearly perfectly black, because the magenta ink is perfectly superimposed over the black ink.

Referring again to FIG. 7, the printer controller 14 then in step 708 compares the measured color value with the expected color value. The expected color value is based on the composite pattern assuming no misalignment.

As with the expected density value of the measurement operation of FIG. 5, the expected color value can be provided to the printer controller in a variety of ways. For example, the printer controller 14 can be preprogrammed with an expected color value for a given ideal composite pattern. In another example, if black ink is one of the inks used in the measurement, and the second color is intended to overlap the black ink, then the printer controller 14 can actually obtain the expected color value by measuring the color of the image field after step 702. In this manner, errors in the absolute registration of the first print head, and/or calibration errors in the detector 28, do not have significant effect on the operation.

Referring again to step 708, after the printer controller 14 compares the expected color value to the measured color value, the printer controller 14 executes step 710. In step 710, the printer controller 14 either sets an alarm or attempts to correct the alignment if the comparison yields an error that is beyond an acceptable threshold. To correct X-axis alignment errors between two different print heads, the X-axis reference alignment of one or more of print heads may be changed. Similarly, to correct X-axis alignment errors between rows on the same print head, the X-axis reference alignment for the individual color rows of the same print head may be changed.

Thus, the above operations provide a method for determining the X-axis alignment of jets in different rows, but having the same X-axis position. It will be appreciated that the above system may be used to measure X-axis alignment of jets of different rows that are not necessarily in the exact same X-axis or horizontal jet position, but within a short range of each other in horizontal jet position. As long as the two jets from the two rows being tested are capable of printing their respective image patterns in the image field, then the horizontal alignment of such jets can be tested using the above-described method.

It will further be appreciated that the operations of FIG. 7 may readily employ density measurements as opposed to color measurements. In particular, the printer controller 14 could obtain a density measurement of the image field in step 706 and compare that measured density value with an expected value in step 708. However, for measurements involving multiple color jets, it has been found that color measurements exhibit greater measurement accuracy.

In any event, the operations of FIG. 7 permit such registration testing to occur without requiring a sensor that has sub-pixel or pixel imaging resolution. Such capabilities allow less expensive components to be employed for alignment testing.

Figure 8:
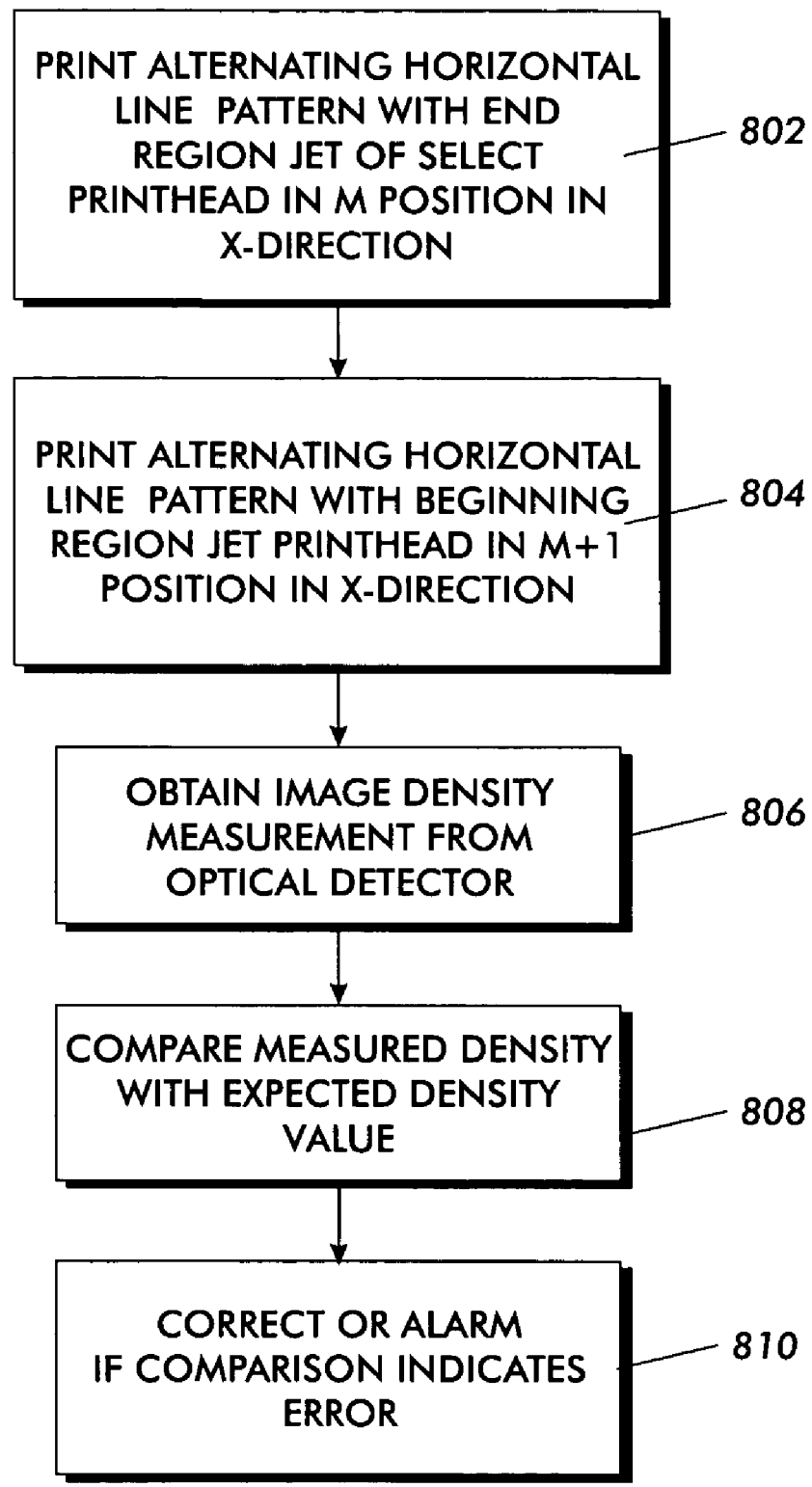
FIG. 8 shows a flow diagram of the operations of the offset printing apparatus of FIG. 1 in performing a first exemplary vertical alignment measurement.

FIG. 8 shows an exemplary third alignment measurement operation which can be employed by the printing apparatus 10 as well as other printing apparatus. Exemplary execution of the flow diagram of FIG. 8 will be described in relation to the printing apparatus illustrated in FIGS. 1, 2 and 4.

The third alignment measurement operation tests for vertical alignment of jets from different print heads in a staggered print head array such as that shown in FIG. 4. By vertical alignment, it is meant that the jets from the different print heads are configured to eject ink at the appropriate position in the Y-axis direction. If the different print heads are mis-aligned or their firing is mis-timed this direction, then resulting printed images will have distortion in which straight lines will not extend straight across the width of the image. Such errors may occur due to mechanical misalignment of the heads, at least with respect to the timing offset references programmed into the printer controller 14. Moreover, mechanical misalignment of the drum 26 itself may result in vertical misalignment between print heads. Vertical misalignment errors may typically be corrected by adjusting the timing of the firing of the various print heads. In particular, a particular print head may be made to print higher or lower in the Y-axis direction with respect to other print heads by changing the timing of the firing of the jets on the print head. As a result of the changed timing, the drum 26 will rotate a little more or a little less before the jets on the affected head fire, thereby effectively changing the vertical alignment of the head.

In general, in step 802, the printer controller 14 causes a select print head, located in a particular X-axis print head position m, to print an alternating horizontal line pattern using only its last jet. The printer controller 14 provides suitable control signals to the print head array 18 and the motor controllers 22, 23 to cause the pattern to fall nominally within a predetermined image field. To this end, the printer controller 14 causes the last jet of the select print head to selectively eject ink over several rotations of the drum, controllably toggling the jet on and off on each pass, and providing for the necessary X-axis translation between passes, to obtain the alternating horizontal line pattern.

Figure 9A:
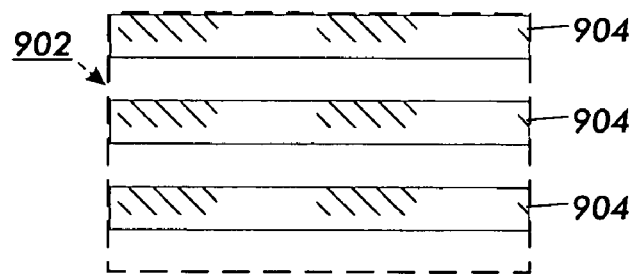
FIGS. 9a–9d show exemplary horizontal line image patterns that may be generated by a printing apparatus disclosed herein.

For example, in step 802, the printer controller 14 could cause the last jet 82 of the row 71a to print an alternating horizontal line pattern such as is shown in FIG. 9a. FIG. 9a shows an image field 902 having a plurality of alternating horizontal lines 904.

In step 804, the printer controller 14 causes the first jet of the next adjacent print head to print an alternating horizontal line pattern. By next adjacent print head, it is meant that the print head in the m+1 horizontal print head position. The alternating horizontal line pattern is identical to and nominally located in the same image field as the horizontal line pattern created in step 802. Accordingly, the image field employed in step 802 must be chosen such that both the last jet of the print head in position m and the first jet of the print head in position m+1 nominally possess the horizontal displacement range to print over the same image field.

Thus, similar to step 802, the printer controller 14 provides suitable control signals to the print head array 18 and the motor controllers 22, 23 to cause the pattern formed in step 804 to fall nominally within a predetermined image field.

Figure 9B:
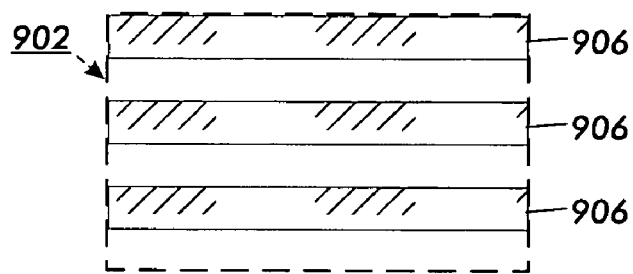

Continuing with the example discussed above in connection with FIG. 9a, the printer controller 14 could cause the first jet 86 of the row 73a to print an alternating horizontal line pattern such as is shown in FIG. 9b. FIG. 9b represents the alternating vertical line image pattern 906 formed in step 804 as if it were printed on a blank surface.

Figure 9C:
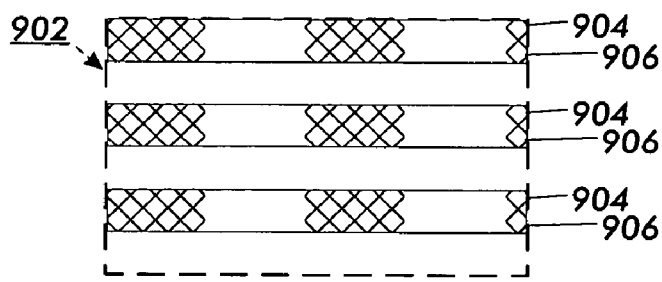
Figure 9D:
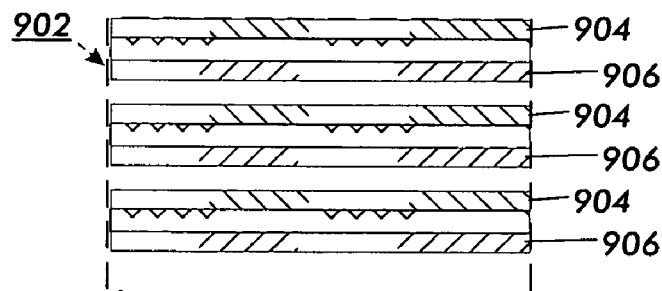

FIGS. 9c and 9d illustrate prophetic examples of the composite image resulting from the printing of the image patterns 904 and 906 in steps 802 and 804, respectively. If the Y-axis or vertical timing alignment between the last jet 82 of row 71a and the first jet 86 of row 73a are relatively well-aligned, then the image pattern 906 will be substantially fully superimposed on the image pattern 904, as shown in FIG. 6c. If, however, the Y-axis alignment between the jet 82 and the jet 86 is inaccurate, then the image pattern 906 will be somewhat offset with respect to the image pattern 904, as shown for example in FIG. 9d.

Referring again to FIG. 8, after step 804, a composite image exists on the drum 26 that is substantially located within the image field. The printer controller 14 performs step 806 to receive from the optical detector 28 a signal representative of an average or overall density of the image field. To this end, the printer controller 14 may perform operations substantially identical to those described above in connection with step 506 of FIG. 5. As discussed above, the optical detector 28 can possess a resolution that is not suitable for obtaining actual pixel-sized image details, but is nevertheless capable of obtaining an overall density measurement (i.e. average density measurement) from the multi-pixel image field. Such a measurement nevertheless contains information regarding the relative alignment of the two print heads. Specifically, because errors in horizontal alignment affect the actual composite image pattern (e.g. compare FIGS. 9c and 9d), errors in alignment will affect the measured density value a corresponding amount.

Continuing in the example discussed above in connection with FIGS. 9a to 9d, it will be appreciated that the measured density value of the composite image in FIG. 9d, in which the jets 82 and 86 are assumed not to be properly aligned, will differ from the measured density value of the composite image in FIG. 9c, in which the jets 82 and 86 are assumed to be properly aligned, because more of the image area is covered with ink in the image of FIG. 9d.

Referring again to FIG. 8, in step 808, the printer controller 14 compares the measured density value with the expected density value. The expected density value is based on the composite pattern assuming no misalignment.

As with the measurement methods that employ vertical line patterns, such as those discussed above in connection with FIGS. 5–7, the expected image density value can be provided to the printer controller in a variety of ways. For example, the expected image density value can be preprogrammed based on empirical or theoretical data, or the expected image density value may be determined by measuring the density after step 802.

After the printer controller 14 compares the expected density value to the measured density value in step 808, the printer controller 14 executes step 810. In step 810, the printer controller 14 either sets an alarm or attempts to correct the alignment if the comparison yields an error that is beyond an acceptable threshold. To correct Y-axis alignment errors between print heads, the time-delta between the printing of the affected print heads may be altered. For example, if the printer controller 14 is initially programmed such that row 73a prints on line y1 of an image at a time difference δ after row 71a prints on the same line y1, then the printer controller 14 adjusts δ upward or downward to compensate for the misalignment. Thus, in future printing, attempts to print jets from row 73a on a certain line will occur at an adjusted δ time after the printer controller 14 prints jets from row 71a on that line. Alternatively, mechanical adjustments may be made.

Thus, the above system provides a system and method for determining the Y-axis alignment of print heads in adjacent X-axis positions without requiring a sensor that has subpixel or pixel imaging resolution. Such capabilities allow less expensive components to be employed for alignment testing.

Figure 10:
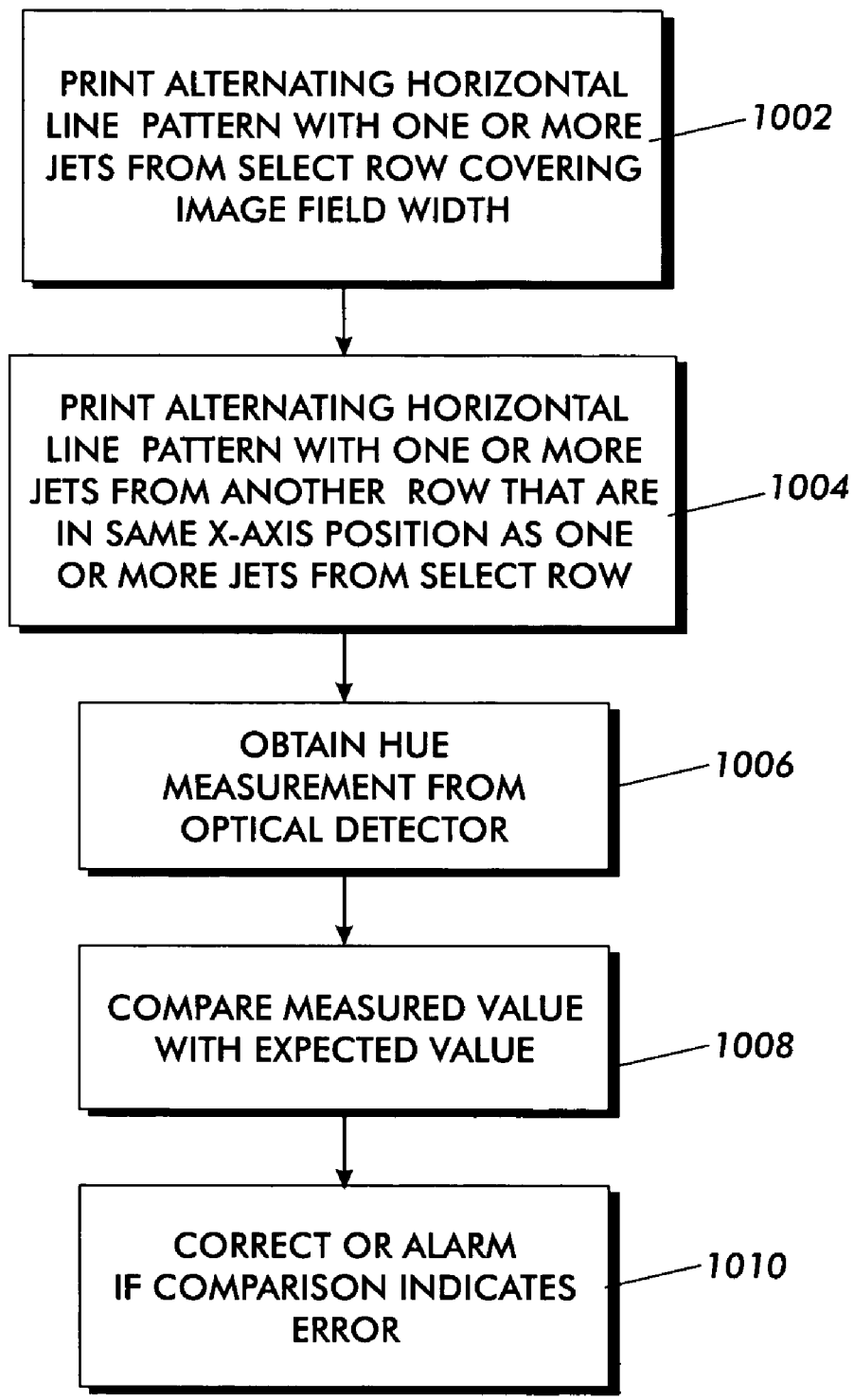
FIG. 10 shows a flow diagram of the operations of the offset printing apparatus of FIG. 1 in performing a second exemplary vertical alignment measurement.

FIG. 10 shows an exemplary fourth alignment measurement operation that can be employed by the printing apparatus 10 as well as other printing apparatus. Exemplary execution of the flow diagram of FIG. 10 will be described in relation to the printing apparatus illustrated in FIGS. 1, 2 and 4.

The fourth alignment measurement operation tests for vertical alignment of jets from different rows, for example, different color ink ejecting jets, in any print head array. As with the third alignment measurement test, vertical alignment essentially tests whether the timing of the firing of jets from different rows are adequately coordinated to effect accurate vertical positioning of jets from different rows in the image. The fourth alignment measurement operation can measure the alignment of jets from different rows of the same print head, or alignment of jets from different rows of the different print heads located in the same X-axis print head position, such as print heads 61 and 65.

For example, the fourth alignment measurement can measure the alignment of the jet 84 of row 71a with respect to the jet 96 of the row 75a of the print head 65. If the different print heads are mis-aligned in this direction (i.e. improperly timed), then the color accuracy of individual pixels will be reduced in printed images, similar to the effects of misalignment of jets in the horizontal direction, discussed above in connection with FIG. 7.

In particular, if one or more jets from a row of jets that is configured to eject one color ink are misaligned in the Y-axis direction with respect to corresponding jets in another row that is configured to eject another color ink, then any color hue that requires mixtures of those inks will not be properly mixed in those pixels that are printed by the misaligned jets. Similar to errors involving alignment of adjacent print heads, errors involving color to color vertical alignment may be corrected in the software executed by the printer controller 14. In particular, the timing δ between the firing of the test rows may be altered to compensate for any vertical misalignment.

In general, in step 1002, the printer controller 14 causes a select jet in a specific jet position n of a select row of a print head to print an alternating horizontal line. The printer controller 14 provides suitable control signals to the print head array 18 and the motor controllers 22, 23 to cause the pattern to fall nominally within a predetermined image field. For example, in step 1002, the printer controller 14 could cause the interior jet 84 of the row 71a to print the alternating vertical line pattern 904 shown in FIG. 9a.

In step 1004, the printer controller 14 causes another jet in the nth position of another row of jets to print an alternating horizontal line pattern. The alternating horizontal line pattern is identical to and nominally located in the same image field as the horizontal line pattern created in step 1002. Thus, similar to step 1002, the printer controller 14 provides suitable control signals to the print head array 18 and the motor controllers 22, 23 to cause the pattern formed in step 1004 to fall nominally within the predetermined image field.

For example, the printer controller 14 could cause the jet 96 of the row 75a of the print head 65 to print an alternating horizontal line pattern 806 represented in FIG. 9b. As a result of the step 1004 of FIG. 10, the image field will contain a composite image that includes both of the horizontal line patterns 904 and 906. The actual appearance of the composite image depends, however, on the accuracy of the alignment between the jets 84 and 96. FIG. 9c shows an example in which the composite image appears largely similar to the individual images 904 and 906 of FIGS. 9a and 9b, representative of a situation in which the jets 84 and 96 are properly aligned. FIG. 9d shows another example in which the composite image differs from the images 904 and 906 as a result of vertical misalignment of the jets 84 and 86.

Referring again to FIG. 10, after step 1004, a composite image exists on the drum 26 that is substantially located within the image field. The printer controller 14 thereafter in step 1006 receives from the optical detector 28 a signal representative of an average or overall color of the image field. Such a measurement contains information regarding the relative alignment of the two print heads. Specifically, because errors in vertical alignment affect the actual composite image pattern (e.g. compare FIGS. 9c and 9d), errors in alignment will affect the measured color value a corresponding amount.

Thereafter, in step 1008, the printer controller 14 compares the measured color value with the expected color value. The expected color value is based on the composite pattern assuming no misalignment. After the printer controller 14 compares the expected color value to the measured color value, the printer controller 14 executes step 1010. In step 1010, the printer controller 14 either sets an alarm or attempts to correct the alignment if the comparison yields an error that is beyond an acceptable threshold. Correction may be carried out similar to the manner described above in connection with step 810 of FIG. 8.

Thus, the above system provides a system and method for determining the Y-axis alignment of jets in different rows. It will be appreciated that the operations of FIG. 10 may readily employ density measurements as opposed to color measurements. In particular, the printer controller 14 could obtain a density measurement of the image field in step 1006 and compare that measured density value with an expected value in step 1008. However, as discussed above, it has been found that color measurements exhibit greater measurement accuracy. In any event, the operations of FIG. 10 permit such registration testing to occur without requiring a sensor that has sub-pixel or pixel imaging resolution. Such capabilities allow less expensive components to be employed for alignment testing.

The above described tests are merely illustrative. It will be appreciated that other alignment tests may readily be carried out using the principles disclosed and claimed herein. For example, skew of a particular print head may be measured by performing the steps of FIG. 8 with jets on the same row of the same print head, separated as far as possible while still within range that both jets ideally may create the required image patterns within the image field. In such a case, a first jet would print a horizontal line pattern in step 802 and a second jet from the same row would print a horizontal line pattern in step 804. If the print head is not skewed or tilted, the resulting composite pattern in the image field should resemble the image of FIG. 9c. If, however, the print head is skewed, then the resulting composite pattern in the image field will evidence offset, such as that shown in FIG. 9d.

Figure 11:
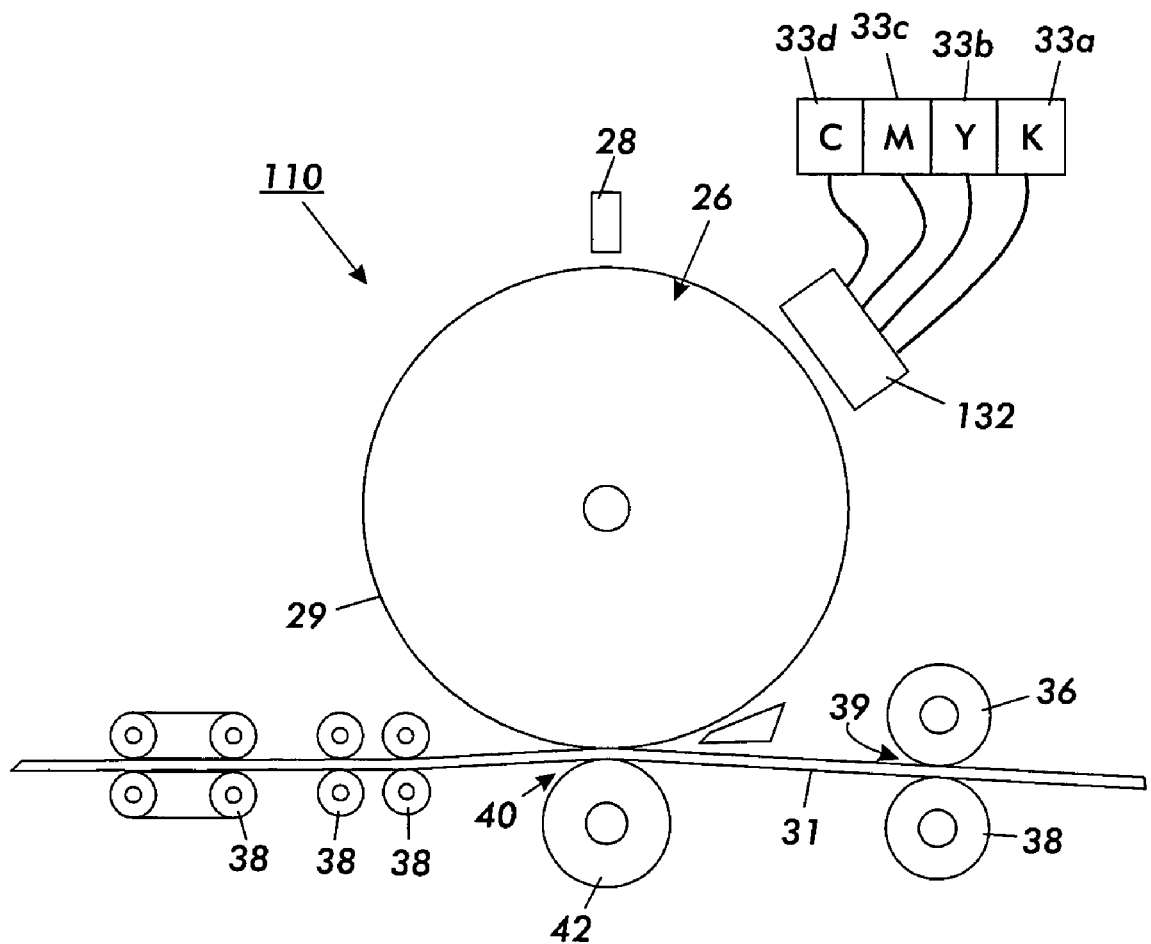
FIG. 11 shows a diagrammatic illustration of mechanical aspects of a second exemplary print engine for an offset ink jet printing apparatus.

At least some of the alignment tests described herein have applicability to a single full width array printing apparatus. FIG. 11 shows an exemplary printing apparatus 110 that has a single full width array print head 132. For clarity of exposition, the remaining elements of the printing apparatus 110 are identical to that of the printing apparatus 10 of FIGS. 1, 2 and 4. However, all four color ink sources 33a–33d are coupled via conduits 34a–34d to provide the four color inks to the print head 132. The print head 132 preferably extends nearly the entire width of the drum 26. As with the staggered full width array printing apparatus 10, the full width array print head 132 nevertheless is capable of at least some X-axis translation to accommodate interleaved printing.

Figure 12:
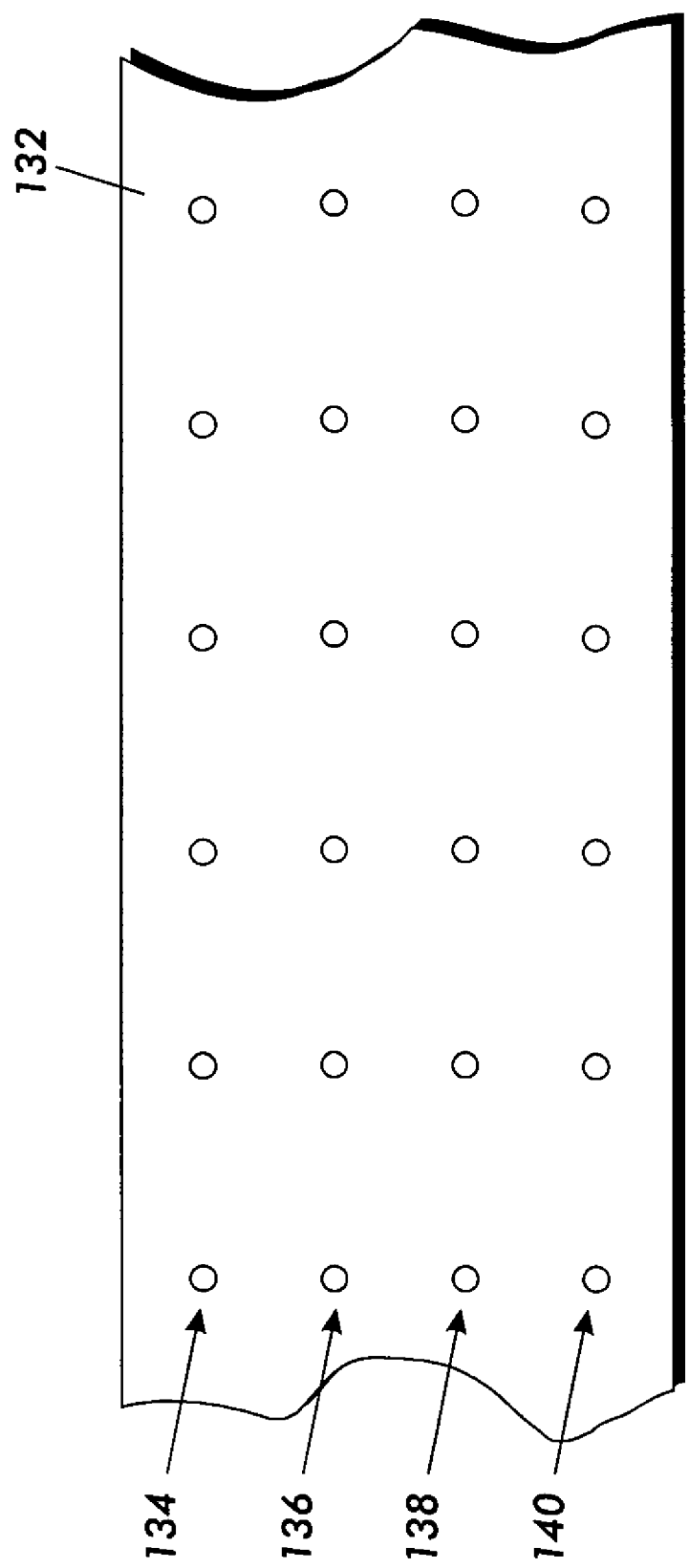
FIG. 12 shows an enlarged fragmentary view of the print head of the print engine of FIG. 11.

FIG. 12 shows a fragmentary view of an exemplary print head 132. The print head 132 includes four rows of jets 134, 136, 138 and 140, each containing an arrangement of jets that extends nearly the full width of the drum 26. The row of jets 134 is configured to print black ink, the row of jets 136 is configured to print yellow ink, the row of jets 138 is configured to print magenta ink, and the row of jets 140 is configured to print cyan ink.

It will be appreciated that the alignment tests of FIGS. 6 and 9 may readily be performed on the print head 132 of the printing apparatus 110. The horizontal alignment tests of FIG. 7 can detect some types of skew or yaw in the print head 132, as well as mechanically misdirected individual jets. The vertical alignment tests of FIG. 10 can detect timing errors in the printing from the various rows of the print head 132.

In addition, some of the tests describe herein may be employed in single pass printers that are incapable of X-direction translation of jet with respect to the drum. For example, the horizontal alignment test of FIG. 7 may be employed by the single pass printer of U.S. Pat. No. 6,113,231 by using a plurality of jets from proximate horizontal positions of one print head to print the first vertical line pattern in step 702 and then use a plurality of jets from corresponding horizontal positions of another print head in the same X-axis print head position to print the second vertical line pattern in step 704. Similarly, the vertical alignment tests of FIG. 10 may readily be carried out by the single pass printer of U.S. Pat. No. 6,113,231 by using a plurality of jets from proximal horizontal positions from one print head to print the first horizontal line pattern in step 1002 and then use a plurality of jets from corresponding horizontal positions of another print head in the same X-axis print head position to print the second horizontal line pattern in step 1004.

Moreover, in multiple pass printers, it is to be noted that each of the image patterns illustrated in FIGS. 6a–6b and 9a–9b may be printed using multiple neighboring jets with fewer revolutions of the drum. In other words, the first image pattern is printed by a first set of multiple jets and the second image patter is printed by a second set of multiple jets. The utilization of multiple neighboring jets to make the each image pattern would provide measurement information related to the average positions of the multiple jets in each set. In some cases, it is more desirable to match up the alignments of print heads to the average of groups of jets rather than just one jet location.

It will be appreciated that the above described embodiments are merely illustrative and that those of ordinary skill in the art may readily devise their own implementations that incorporate the principles of the present invention and fall within the spirit and scope thereof.

The invention claimed is:

1. A method comprising:
   ejecting ink from a first set of one or more nozzles in a first print head in a staggered print head array to form a first image pattern larger than a single pixel at least partially within an image field located on an intermediate revolving drum;
   ejecting ink from a second set of one or more nozzles in a second print head in the staggered print head array to form a second image pattern larger than a single pixel at least partially within the image field located on the intermediate revolving drum, the first image pattern and second image pattern forming a composite pattern that is larger than a single pixel within the image field located on the intermediate revolving drum;
   employing an optical detector having image resolution greater than a single pixel to obtain a measurement of an optical characteristic of the image field located on the intermediate revolving drum;
   comparing the optical characteristic measurement to a reference optical characteristic to determine whether one of the first and the second print heads in the staggered print head array exhibits an X-axis alignment error; and
   adjusting the X-axis reference for the print head in the staggered print head array that was determined to exhibit the X-axis alignment error.

2. The method of claim 1 further comprising rotating the intermediate revolving drum multiple revolutions past the first and the second print heads to form the first and the second image patterns.

3. The method of claim 1 wherein the reference optical characteristic comprises a previously measured optical characteristic.

4. The method of claim 1 wherein the reference optical characteristic comprises an expected optical characteristic.

5. The method of claim 4, further comprising obtaining the expected optical characteristic based on a measurement of the first image pattern located on the intermediate revolving drum.

6. The method of claim 1, the optical characteristic measurement comparison further comprising determining whether one of the first and the second print heads in the staggered print head array exhibits a Y-axis alignment error between the first set of nozzles and the second set of nozzles; and adjusting timing for firing the print head in the staggered print head array that was determined to exhibit the Y-axis alignment error.

7. The method of claim 1, further comprising ejecting ink from the second set of nozzles in the second print head to form the second image pattern on the intermediate revolving drum such that the second image pattern on the intermediate revolving drum is superimposed on the first image pattern on the intermediate revolving drum.

8. The method of claim 1, further comprising:

ejecting ink from the first set of nozzles to form the first image pattern on the intermediate revolving drum as a first plurality of lines; and ejecting ink from the second set of nozzles to form the second image pattern on the intermediate revolving drum as a second plurality of lines.

9. The method of claim 8, further comprising ejecting ink from the first set of nozzles to form the first image pattern on the intermediate revolving drum as a first plurality of vertical lines; and ejecting ink from the second set of nozzles to form the second image pattern on the intermediate revolving drum as a second plurality of vertical lines.

10. The method of claim 8, further comprising ejecting ink from the first set of nozzles to form the first image pattern on the intermediate revolving drum as a first plurality of horizontal lines; and ejecting ink from the second set of nozzles to form the second image pattern on the intermediate revolving drum as a second plurality of horizontal lines.

11. The method of claim 1, further comprising employing the optical detector having image resolution greater than a single pixel to obtain a measurement of an optical density characteristic for an area of the image field on the intermediate revolving drum that is greater than a single pixel.

12. The method of claim 1, further comprising employing the optical detector to obtain a measurement of an optical color characteristic for an area of the image field on the intermediate revolving drum that is greater than a single pixel.

13. An arrangement for use in a printing device, the arrangement comprising:

an optical detector movably mounted proximate to an intermediate revolving drum, the optical detector having a resolution exceeding a size of a single pixel; and a processing circuit operable to cause a first set of one or more nozzles in a first print head of a staggered print head array to print a first image pattern at least partially within an image field located on the intermediate revolving drum, each nozzle of the first set operable to print an image pixel, cause a second set of one or more nozzles in a second print head of the staggered print head array to print a second image pattern at least partially within the image field located on the intermediate revolving drum, each nozzle of the second set operable to print an image pixel, compare measurements of an optical characteristic of the image field located on the intermediate revolving drum with a reference optical characteristic for the image field located on the intermediate revolving drum, the measurements being received from the optical detector, and the comparison being used to determine whether one of the first and the second print heads in the staggered print head array exhibits an X-axis alignment error; and adjust the X-axis reference for the print head in the staggered print head array that was determined to exhibit the X-axis alignment error.

14. The arrangement of claim 13 wherein the processing circuit is further operable to control rotation of the intermediate revolving drum so the drum revolves multiple revolutions past the first and the second print heads to form the first and the second image patterns.

15. The arrangement of claim 13, wherein the processing circuit is further operable to employ an expected optical characteristic as the reference optical characteristic.

16. The arrangement of claim 13 wherein the optical detector is a densitometer.

17. The arrangement of claim 13 wherein the optical detector is a colorimeter.

18. A method comprising:

printing a first image pattern at least partially within an image field on an intermediate revolving drum using a first set of one or more nozzles in a first print head of a staggered print head array, each nozzle of the first set operable to print an image pixel;

printing a second image pattern at least partially within the image field on the intermediate revolving drum using a second set of one or more nozzles in a second print head of the staggered print head array, each nozzle of the second set operable to print an image pixel; and measuring an optical characteristic of the image field using a optical detector having a resolution exceeding a pixel size to determine whether one of the first and the second print heads in the staggered print head array exhibits an X-axis alignment error; and adjusting the X-axis reference for the print head in the staggered print head array that was determined to exhibit the X-axis alignment error.

19. The method of claim 18, further comprising:

printing the first image pattern on the intermediate revolving drum as a first plurality of vertical lines; and printing the second image pattern on the intermediate revolving drum as a second plurality of vertical lines.

20. The method of claim 18, further comprising:

printing the first image pattern on the intermediate revolving drum as a first plurality of horizontal lines; and printing the second image pattern on the intermediate revolving drum as a second plurality of horizontal lines.

* * * * *